(12) United States Patent
Oomoto et al.

(10) Patent No.: US 7,496,382 B2
(45) Date of Patent: Feb. 24, 2009

(54) COMMUNICATION SYSTEM AND ITS TERMINAL

(75) Inventors: Masao Oomoto, Kasuya-Gun (JP); Satoshi Ando, Munakata-Gun (JP); Yuichi Kawaguchi, Kasuya-Gun (JP); Masato Ohura, Iizuka (JP); Yuji Shimizu, Koga (JP)

(73) Assignee: Panasonic Corporation, Osaka (JP)

( * ) Notice: Subject to any disclaimer, the term of this patent is extended or adjusted under 35 U.S.C. 154(b) by 1145 days.

(21) Appl. No.: 10/759,190

(22) Filed: Jan. 20, 2004

(65) Prior Publication Data

US 2004/0162113 A1 Aug. 19, 2004

(30) Foreign Application Priority Data

Jan. 21, 2003 (JP) ............................. 2003-012034

(51) Int. Cl.
 *H04B 1/38* (2006.01)
 *H04L 12/56* (2006.01)
(52) U.S. Cl. ..................... 455/560; 455/561; 455/556.1
(58) Field of Classification Search ................. 455/560, 455/561, 556.1, 556.2, 557, 509, 517, 450, 455/451, 452.1, 452, 2; 370/254, 329, 256, 370/400, 351, 225, 227, 401, 449; 709/242, 709/244, 238, 208, 252
See application file for complete search history.

(56) References Cited

U.S. PATENT DOCUMENTS

| 5,293,635 | A | | 3/1994 | Faulk, Jr. et al. |
| 6,094,431 | A | * | 7/2000 | Yamato et al. ......... 370/395.21 |
| 6,708,034 | B1 | * | 3/2004 | Sen et al. .................... 455/445 |
| 7,334,047 | B1 | * | 2/2008 | Pillay-Esnault ............. 709/242 |
| 2003/0110290 | A1 | * | 6/2003 | Hiyama et al. .............. 709/242 |

OTHER PUBLICATIONS

K. de Graaf et al., "Definitions of Managed Objects for IEEE 802.3 Repeater Devices using SMIv2", Network Working Group, Request for Comments: 2108, Feb. 1997, pp. 1-82.

* cited by examiner

*Primary Examiner*—Melur Ramakrishnaiah
(74) *Attorney, Agent, or Firm*—Wenderoth, Lind & Ponack, L.L.P.

(57) ABSTRACT

A terminal comprises a packet receiving unit, a packet sending unit, a link-state detecting unit that detects a link-up to a switching device, a configuration-change notifying unit, and a resource reservation table. When the link-state detecting unit detects a link-up, the terminal notifies network configuration information and network resource reservation information to a management device. When a link state is changed, the management device can immediately manage the network based on the latest network configuration information and the latest network resource information.

26 Claims, 17 Drawing Sheets

Fig. 1
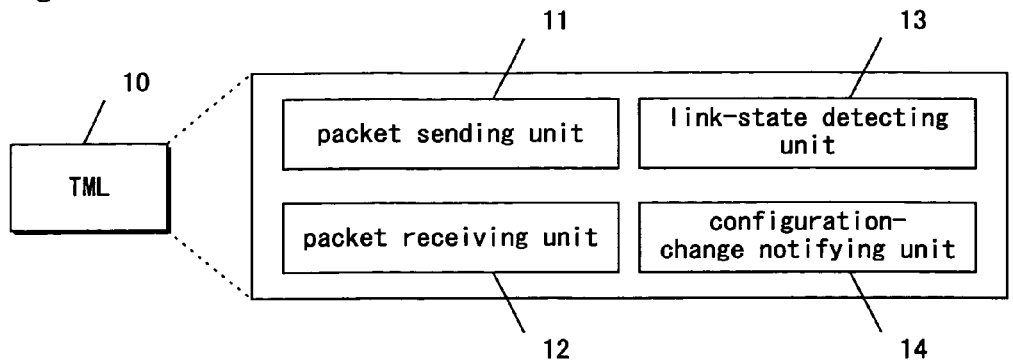
Fig. 2
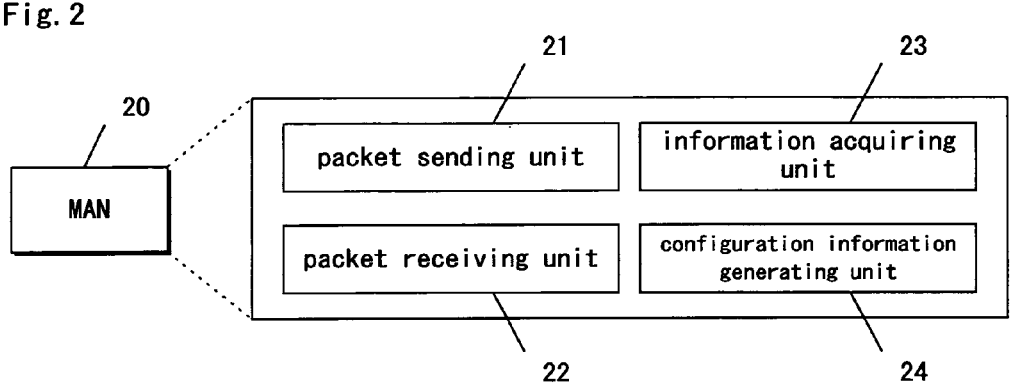
Fig. 3(a)
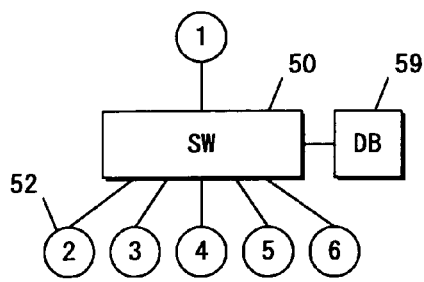
Fig. 3(b)
| port number | 1 | 2 | 3 | 4 | 5 | 6 |
|---|---|---|---|---|---|---|
| MAC address | – | – | – | – | – | – |

Fig. 5(a)
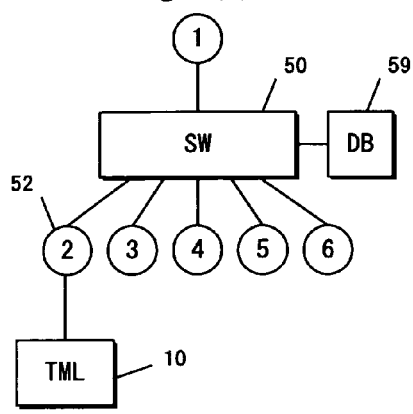
Fig. 5(b)
| port number | 1 | 2 | 3 | 4 | 5 | 6 |
|---|---|---|---|---|---|---|
| MAC address | – | – | – | – | – | – |
Fig. 6(a)
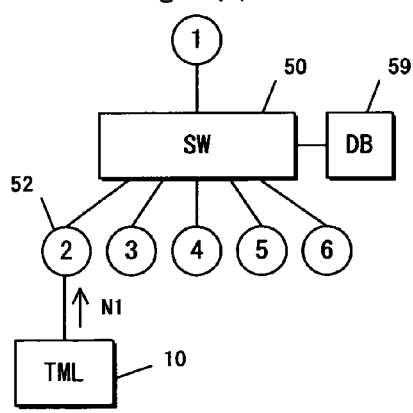
Fig. 6(b)
| port number | 1 | 2 | 3 | 4 | 5 | 6 |
|---|---|---|---|---|---|---|
| MAC address | – | m10 | – | – | – | – |
Fig. 6(c)
| destination of MAC | source of MAC m10 | contents of packet |
|---|---|---|

| port number | 1 | 2 | 3 | 4 | 5 | 6 |
|---|---|---|---|---|---|---|
| MAC address | – | – | – | – | – | – |

| port number | 1 | 2 | 3 | 4 | 5 | 6 |
|---|---|---|---|---|---|---|
| MAC address | – | m10 | – | – | – | – |

| port number | 1 | 2 | 3 | 4 | 5 | 6 |
|---|---|---|---|---|---|---|
| MAC address | – | – | m10 | – | – | – |
| | | | m50 | | | |

| port number | 1 | 2 | 3 | 4 | 5 | 6 |
|---|---|---|---|---|---|---|
| MAC address | m60 | m10 | – | – | – | – |

Fig. 10

| code | IP address | MAC address |
|---|---|---|
| 20 | 192.168.0.100 | m20 |
| 50 | 192.168.0.1 | m50 |
| 60 | 192.168.0.2 | m60 |
| 70 | 192.168.0.3 | m70 |
| 80 | 192.168.0.20 | m80 |
| 90 | 192.168.0.30 | m90 |
| 100 | 192.168.0.10 | m100 |

Fig. 11(a)

| port number | 1 | 2 | 3 | 4 | 5 | 6 |
|---|---|---|---|---|---|---|
| MAC address | m20 | – | m60 | – | – | m70 |
|  |  |  | m100 |  |  | m80 |
|  |  |  |  |  |  | m90 |

Fig. 11(b)

| port number | 1 | 2 | 3 | 4 | 5 | 6 |
|---|---|---|---|---|---|---|
| MAC address | – | m50 | – | – | – | m100 |
|  |  | m70 |  |  |  |  |
|  |  | m80 |  |  |  |  |
|  |  | m90 |  |  |  |  |
|  |  | m20 |  |  |  |  |

Fig. 11(c)

| port number | 1 | 2 | 3 | 4 | 5 | 6 |
|---|---|---|---|---|---|---|
| MAC address | – | – | m80 | – | m50 | m90 |
|  |  |  |  |  | m60 |  |
|  |  |  |  |  | m100 |  |
|  |  |  |  |  | m20 |  |

Fig. 14(a)

| port number | 1 | 2 | 3 | 4 | 5 | 6 |
|---|---|---|---|---|---|---|
| MAC address | m20 | – | m60 | – | – | m70 |
| | | | | | | m80 |
| | | | | | | m90 |
| | | | | | | m100 |

Fig. 14(b)

| port number | 1 | 2 | 3 | 4 | 5 | 6 |
|---|---|---|---|---|---|---|
| MAC address | – | m50 | – | – | – | – |
| | | m70 | | | | |
| | | m80 | | | | |
| | | m90 | | | | |
| | | m20 | | | | |
| | | m100 | | | | |

Fig. 14(c)

| port number | 1 | 2 | 3 | 4 | 5 | 6 |
|---|---|---|---|---|---|---|
| MAC address | m100 | – | m80 | – | m50 | m90 |
| | | | | | m60 | |
| | | | | | m20 | |

Fig. 19(a)

| reservation ID | source | destination | communication path | reservation bandwidth |
|---|---|---|---|---|
| 2 | m100 | m80 | m100, m60, m80 | 6Mbps |

Fig. 19(b)

| reservation ID | source | destination | communication path | reservation bandwidth |
|---|---|---|---|---|
| 1 | m110 | m90 | m110, m50, m70, m90 | 6Mbps |

Fig. 19(c)

| reservation ID | source | destination | communication path | reservation bandwidth |
|---|---|---|---|---|
| 1 | m110 | m90 | m110, m50, m70, m90 | 6Mbps |
| 2 | m100 | m80 | m100, m60, m80 | 6Mbps |
| ... | ... | ... | ... | ... |

Fig. 20

| reservation ID | source | destination | communication path | reservation bandwidth |
|---|---|---|---|---|
| 1 | m110 | m90 | m110, m50, m70, m90 | 6Mbps |
| 2 | ~~m100~~ | ~~m80~~ | ~~m100, m60, m80~~ | ~~6Mbps~~ |
| 3 | m100 | m80 | m100, m60, m50, m70, m80 | 6Mbps |
| ... | ... | ... | ... | ... |

COMMUNICATION SYSTEM AND ITS TERMINAL

BACKGROUND OF THE INVENTION

1. Field of the Invention

The present invention relates to a communication system that manages a network, by generating network configuration information and network resource reservation information when a terminal comprising the network moves.

2. Description of the Related Art

There are a switching hub and a management-functioning switching hub as examples of switching devices used in a network. These hubs are explained in the followings.

<Switching Hub>

A general switching hub (including a bridge) has a filtering database. The filtering database is sometime called a MAC (physical) address learning table or a filtering table.

When a packet reaches a port of a switching hub, the switching hub correlates the port that has received the packet and a source MAC address of a terminal that has sent the packet. The switching hub stores the correlated port and MAC address in the filtering database. In this way, the switching hub memorizes configuration information that the terminal is connected to a "point" of the port.

The "point" means two cases; one is a case that the terminal is directly connected to the port, and the other is a case that a further switching hub is connected to the port and the terminal is connected to a port of the further switching hub.

A plurality of source MAC addresses may be memorized to one port.

By using the filtering database, when a packet is received, the switching hub looks at a destination MAC address for the packet, and then knows which port the packet should be sent to. The switching hub transmits packets by such a scheme.

<Management-functioning Switching Hub>

A management-functioning switching hub (including a bridge) has a function to return possessing management information, in response to inquiry of an SNMP (Simple Network Management Protocol). The possessing management information includes, for example, a state of a link (link-up/link-down) for the port, a link speed (e.g. 10 Mbps, 100 Mbps), and a filtering database for every port, etc.

Some of the management-functioning switching hubs have a function which is called an SNMP trap. When an event (link-up/link-down of the port, and occurrence of trouble etc.) relating to the switching hub happens, the switching hub can notify a management server of the event by the SNMP trap.

Originally, the SNMP is a protocol for managing a network efficiently. In a prior art communication system, a management device acquires management information for each switching hub, for example, by using the SNMP periodically.

A method of determining a topology of LAN from the filtering database stored in the management-functioning switching hub is described in 'RFC2108 "Definitions of Managed Objects for IEEE 802.3 Repeater Devices using SMIv2", p. 75, Section 4, Topology Mapping'.

The prior art communication system presumes that a network possesses a personal computer as a terminal thereof, and basically takes into consideration only a static topology. Therefore, it cannot cope with a possible terminal movement immediately.

In the prior art communication system, timing for updating the filtering database of the switching hub is not relevant to the terminal movement. Therefore, after the terminal movement until a next updating of the filtering database, configuration information of the network, which the management device possesses, does not agree with the actual configuration.

As technology advances, it is obvious that a situation will occur sooner or later, where not only the personal computers but also networking household appliances, able to be connected to a network, are used as such kinds of terminals.

In a network environment represented by the Internet, communication is performed by dividing information to a unit called a packet and transmitting a series of the packet.

Generally, the transmission of a series of the packet is processed by a best effort. This means that all kinds of traffic that may require a real time process or may not are treated equally. Traffic such as audio transmission and video transmission requires the real time process, while traffic such as a file transfer does not require the real time process.

As a result, when the network is crowded with a great amount of traffic such as a lot of file transfer, the audio transmission or the video transmission may be adversely affected, causing a break-off of the audio or a disorder of the video when they are received. Therefore, the transmissions encounter difficulties.

In order to perform the audio transmission and the video transmission, which require the real time process, without difficulties, it is necessary to secure network resources on a communication path. As one of the methods of reserving such network resources, the IETF (Internet Engineering Task Force) has provided a RSVP (Resource Reservation Protocol) as an Internet standard. The contents of the RSVP are described in RFC2205 "Resource ReSerVation Protocol (RSVP)-Version 1 Functional Specification".

According to the RSVP, before a communication starts, a necessary network resource for the communication is secured in switching devices, which exist on a path to be used for the communication. Thereby, a necessary network resource can be secured for every pieces of traffic, and communication quality can be guaranteed.

An SBM (Subnet Bandwidth Manager) is provided as a protocol to practice an RSVP-based receiving control and network resource management, which operates on an IEEE-802 LAN. The SBM realizes bandwidth reservation in a data link layer or Layer 2 of the OSI Reference Model, by a bandwidth management function called DSBM (Designated SBM). The content of the DSBM is described in RFC2814 "SBM (Subnet Bandwidth Manager): A Protocol for RSVP-based Admission Control over IEEE 802-style networks".

Next, operation of the RSVP is explained. In the RSVP, bandwidth reservation is made by transmitting and receiving control messages among a switching device, a sending terminal, and a receiving terminal that support the RSVP. The sending terminal transmits a "PATH" message to the receiving terminal. The "PATH" message describes the traffic characteristics of data to be transmitted. The transmitted "PATH" message reaches the receiving terminal via the switching device along the communication path. The receiving terminal in receipt of the "PATH" message transmits a "RESV" message to the sending terminal. The "RESV" message describes a network resource necessary for receiving the data by the receiving terminal itself. Network devices on the path, such as the switching device, reserve their own network resource according to the contents of the "RESV" message. Thereby, the network resource for the communication between the sending terminal and the receiving terminal is reserved. The reserved resource can be continuously held by transmitting the "RESV" message periodically.

Resource reservation represented by the protocols such as the RSVP and the SBM mentioned above, assumes basically a static network configuration. At the time of starting services, network resource reservation is made along a communication path and a reservation message is periodically sent in order to hold the network resource continuously. Therefore, such a resource reservation scheme based on the prior art can not fully cope with a situation where a terminal moves during the communication, thus changing the network configuration. An example of the problem involved in such prior art is described below.

According to the prior art, when a terminal moves and a communication path changes, disagreement occurs between the communication path specified by the reservation information and the actual communication path. While the disagreement continues, a bandwidth for the communication by the sending terminal cannot be guaranteed, and a network resource reservation of other terminals may also be hindered.

FIG. 22 is an explanatory diagram (1), illustrating paths on a network according to the prior art. A terminal 1 and a terminal 2 are connected to a switching device 6; a terminal 3 is connected to a switching device 7; and a terminal 4 is connected to a switching device 5. The switching device 5 is connected to the switching device 6 and the switching device 7. All the switching devices compose a tree-shaped network. Here, transmission bandwidth among the switching devices and between each of the switching devices and a terminal connected to each of the switching devices is assumed to be 10 Mbps, respectively.

It is supposed that network resources are reserved for performing data transmission of a 6-Mbps bandwidth from the terminal 4 to the terminal 3 using a path P1 via the switching device 5 and the switching device 7, and for performing data transmission of the same 6-Mbps bandwidth from the terminal 1 to the terminal 2 using a path P2 via the switching device 6. Therefore, the data transmission between each terminal is smoothly performed in this situation.

It is now supposed that the terminal 2 moves to a place shown in the dotted line from the place shown in the solid line in the direction of an arrow M1, changing the connection from the switching device 6 to the switching device 7. Immediately after the movement, the reservation of the network resource is not made in a new path P3 via the switching device 6, the switching device 5, and the switching device 7. In the situation, if the terminal 1 continues sending packets to the terminal 2, without knowing that the terminal 2 has already moved, conflict may occur on a path between the switching device 5 and the switching device 7. This is because that the bandwidth already used for the data transmission between the terminal 4 and the terminal 3 and the bandwidth required for the new data transmission between the terminal 1 and the terminal 2 via the path P3 add to a sum of 12 Mbps, thus exceeding the transmission bandwidth (10 Mbps) of the path between the switching device 5 and the switching device 7. Therefore, there are some difficulties for each of the data transmission.

Furthermore, the following problems may occur.

FIG. 23 is an explanatory diagram (2), illustrating paths with the same network configuration as shown in FIG. 22. In FIG. 23, a network resource for a 6-Mbps bandwidth data transmission between the terminal 3 and the terminal 2 have been made, using a path P4 from the terminal 3 to the terminal 2 via the switching device 7, the switching device 5, and the switching device 6. It is supposed that the terminal 2 moves from the present place to a new place shown by a dotted line, in the direction of an arrow M2, and changes its connection from the switching device 6 to the switching device 7 and its path from the path P4 to a new path P5. Immediately after the movement, the network resource that the terminal 2 has used along the path P4 is not released yet. At this moment, the terminal 4 tries in vain to reserve a network resource for a 6-Mbps bandwidth data transmission to the terminal 1 along a path P6 via the switching device 5 and the switching device 6. The reservation requested by the terminal 4 can not be fulfilled, although the reservation can be actually made. This is because that the reservation of the network resource between the switching device 5 and the switching device 6 has not yet been released.

Above mentioned problems occur since the resource reservation according to the prior art, which is represented by protocols such as the RSVP and the SBM, cannot instantaneously respond to the terminal movement.

It is impossible to predict actions of general users who use, as terminals, networking appliances that are able to connect to a network. It is considered that such terminals would move more frequently than personal computers that are only used as terminals.

For example, it is plausible to consider that a user extracts a cable connected to a television (an example of the networking appliances) while it is receiving a video, and puts the cable into another port. In that case, the communication path, in which the video data flows, changes. This may adversely affect service for other networking household information appliances.

In a case where a network is composed of a plurality of fixed switching devices and a plurality of terminals (computers, portable video processing devices etc.) that are connected to the switching devices by wireless, it should be presupposed that a connection destination of each of the terminals changes from moment to moment. Therefore, it is expected that the prior art mentioned above is not capable of responding to the situation.

Moreover, under the circumstances of wireless LAN's and mobile devices that have been remarkably spread out recently, it is obvious that changes of communication paths due to the terminal movement may occur frequently. Therefore, a solution for the problem is required.

OBJECTS AND SUMMARY OF THE INVENTION

An object of the present invention is, in a network capable of reserving a network resource, to provide a communication system operable to reserve a necessary network resource, by immediately reflecting situational changes in network configuration and network resource reservation due to a moved terminal, to network configuration information and network resource reservation information which a management device possesses.

A first aspect of the present invention provides a communication system comprising: plural switching devices, each thereof possessing plural ports; a terminal operable to be connected to any one of the plural ports of one of the plural switching devices; and a management device comprising a configuration information generating unit operable to generate configuration information of a network composed of the plural switching devices and plural pieces of the terminal, wherein each of the plural switching devices further comprises a MAC address table operable to store information of a source MAC address, the MAC address table being assigned to each of the plural ports, and wherein the terminal comprises: a packet receiving unit operable to receive a packet; a packet sending unit operable to send a packet; a link-state detecting unit operable to detect a link-up for each of the plural switching devices; and a configuration-change notifying unit operable, when the link-state detecting unit detects a link-up, to send the management device notice of a change of a network configuration using the packet sending unit.

According to the construction described above, the management device can promptly detect a terminal movement and its movement destination, and can promptly reflect changes in the network configuration to the configuration information of the network.

A second aspect of the present invention provides the communication system as defined in the first aspect of the present invention, wherein the notice is sent in one or more link-change notifying packets.

According to the construction described above, all link-change notices from different kinds of the terminals can be systematically processed by an easy method.

A third aspect of the present invention provides the communication system as defined in the first aspect of the present invention, wherein the notice is sent in one or more substitute packets other than the one or more link-change notifying packets.

According to the construction described above, it is not necessary to exclusively transmit one or more link-change notifying packets in order to notice the link-change. Therefore, the burden of transmission and reception can be alleviated, and increase of the amount of traffic along a communication path can be suppressed.

A fourth aspect of the present invention provides the communication system as defined in the first aspect of the present invention, wherein the notice sent in the one or more substitute packets includes one of an ICMP message, information of services available at the terminal, and information of a phone number of the terminal.

According to the construction described above, substitute information for the link-change notice is promised beforehand between each terminal and the management device, so that the terminal can notify the management device that the link has changed, by sending the substitute packet including the substitute information. For example, when the link change is detected, the terminal can send a message of ICMP (Internet Control Message Protocol) as the substitute information, and can notify the managing device that the link has changed. If the terminal is a server, the server may send information of services available at the server as the substitute information, thereby notifying the managing device that the link has changed. If the terminal is an IP phone, the IP phone may send telephone number information of the IP phone as the substitute information, thereby notifying the managing device that the link has changed.

A fifth aspect of the present invention provides the communication system as defined in the first aspect of the present invention, wherein the notice is sent by at least one of a multi-cast and a broadcast.

According to the construction described above, MAC address tables of the switching devices composing the network can be updated all at once.

A sixth aspect of the present invention provides the communication system as defined in the first aspect of the present invention, wherein the management device comprises an information acquiring unit operable, in receipt of the notice from the terminal, to acquire pieces of information of MAC address concerning the ports from the plural switching devices, and wherein the configuration information generating unit updates the configuration information of the network, based on the pieces of information acquired by the information acquiring unit.

According to the construction described above, time necessary for the management device to detect a configuration change in the network is shortened.

A seventh aspect of the present invention provides the communication system as defined in the sixth aspect of the present invention, wherein the information acquiring unit acquires information of MAC address using an SNMP.

According to the construction described above, the information of the MAC address can be acquired without making a drastic change from the prior communication system.

An eighth aspect of the present invention provides the communication system as defined in the sixth aspect of the present invention, wherein the information acquiring unit acquires information of MAC address only from the plural switching devices exiting in a path from the terminal having sent the notice to the management device.

According to the construction described above, the management device can grasp changes in the network configuration with a minimum information gathering. Using the gathered information, the management device can prevent from pressing a bandwidth which other communication uses.

A ninth aspect of the present invention provides a communication system comprising: plural switching devices, each thereof possessing plural ports; and a terminal operable to be connected to any one of the plural ports of one of the plural switching devices, wherein the terminal comprises: a packet receiving unit operable to receive a packet; a packet sending unit operable to send a packet; a link-state detecting unit operable to detect a link-up for each of the plural switching devices; a resource reservation table operable to store network resource reservation information of the terminal and a communication partner's terminal; and a configuration-change notifying unit operable, when the link-state detecting unit detects a link-up, to send the communication partner's terminal notice of the network resource reservation information stored in the resource reservation table using the packet sending unit.

According to the construction described above, a terminal movement can be promptly detected, a network resource that becomes unnecessary due to the terminal movement can be promptly released, and a newly necessary network resource can be promptly reserved. Therefore, efficient usage of the network resource and high quality communication can be realized.

A tenth aspect of the present invention provides the communication system as defined in the ninth aspect of the present invention, wherein the notice of the network resource reservation information is sent by at least one of a multi-cast and a broadcast.

According to the construction described above, new reservation information of the network resource due to the terminal movement can be notified all at one. Thereby, the network operation can be performed efficiently.

An eleventh aspect of the present invention provides the communication system as defined in the ninth aspect of the present invention, wherein the notice of the network resource reservation information is sent only to the communication partner's terminal stored in the resource reservation table.

According to the construction described above, the network resource reservation information can be updated with a minimum number of notices. Therefore, wastefulness can be eliminated.

A twelfth aspect of the present invention provides the communication system as defined in the ninth aspect of the present invention, wherein securing network resource based on the network resource reservation information is practiced by an RSVP.

According to the construction described above, a necessary network resource can be secured without making a drastic change from the prior communication system.

A thirteenth aspect of the present invention provides a communication system comprising: plural switching devices, each thereof possessing plural ports; a terminal operable to be connected to any one of the plural ports of one of the plural switching devices; and a management device comprising a network resource management table operable to store network resource reservation information of a network comprising the plural switching devices and plural pieces of the terminal, the management device further comprising a network resource managing unit operable to manage resources of the network, wherein the terminal comprises: a packet receiving unit operable to receive a packet; a packet sending unit operable to send a packet; a link-state detecting unit operable to detect a link-up for each of the plural switching devices; a resource reservation table operable to store network resource reservation information between the terminal and a communication partner's terminal; and a configuration-change notifying unit operable, when the link-state detecting unit detects a link-up, to send the management device notice of the network resource reservation information stored in the network resource management table, using the packet sending unit.

According to the construction described above, the management device can promptly grasp a network resource that becomes unnecessary and a network resource that becomes newly necessary, due to the terminal movement. Thereby, network operation can be performed efficiently.

A fourteenth aspect of the present invention provides the communication system as defined in the thirteenth aspect of the present invention, wherein the network resource managing unit of the management device is operable to generate reservation availability information indicating availability of a network resource reservation requested by the terminal, after examining the network resource reservation information received from the terminal, the network resource managing unit updates the network resource reservation information stored in the network resource management table, based on the reservation availability information; and the network resource managing unit sends notice of the reservation availability information to the terminal and a communication partner's terminal.

According to the construction described above, the management device is able to examine the network resource reservation information received from the terminal, and to judge availability of the network resource reservation requested by the terminal, and to notify the judged result to the terminal and a communication's partner of the terminal. Therefore, the unified management of a network resource becomes possible.

A fifteenth aspect of the present invention provides a communication system comprising: plural switching devices, each thereof possessing plural ports; a terminal operable to be connected to any one of the plural ports of one of the plural switching devices, and a management device operable to manage a network composed by the plural switching devices and plural pieces of the terminal, wherein each of the plural switching devices further comprises a MAC address table operable to store information of a source MAC address, the MAC address table being assigned to each of the plural ports, wherein the terminal comprises: a packet receiving unit operable to receive a packet; a packet sending unit operable to send a packet; a link-state detecting unit operable to detect a link-up for each of the plural switching devices; a resource reservation table operable to store network resource reservation information between the terminal and a communication partner's terminal; and a configuration-change notifying unit operable to send the management device notice of a configuration change in the network and notice of the network resource reservation information, wherein the management device comprises: a packet receiving unit operable to receive a packet; a packet sending unit operable to send a packet; an information acquiring unit operable to acquire pieces of information of a MAC address concerning the ports from the plural switching devices; a configuration information generating unit operable to generate configuration information of the network; a network resource management table operable to store network resource reservation information of the network; and a network resource managing unit operable to manage a network resource of the network, wherein when the link-state detecting unit detects a link-up, the terminal sends the management device notice of the configuration change of the network and notice of the network resource reservation information stored in the network resource management table, and wherein when the management device receives the notice from the terminal, the information acquiring unit acquire pieces of information of a MAC address concerning the ports from the plural switching devices, the configuration information generating unit updates the network configuration information, based on the pieces of information acquired by the information acquiring unit, and the network resource managing unit generates reservation availability information indicating availability of a network resource reservation requested by the terminal, after examining the network resource reservation information received from the terminal, the network resource managing unit updates the network resource reservation information stored in the network resource management table, based on the reservation availability information, and the network resource managing unit sends notice of the reservation availability information to the terminal and a communication partner's terminal.

According to the construction described above, the management system can promptly detect the terminal movement and the movement destination, and can promptly reflect changes in the network configuration to the network configuration information. Time necessary for the management device to detect a configuration change in the network is shortened. The management device can promptly grasp a network resource that becomes unnecessary and a network resource that becomes newly necessary, due to the terminal movement. Thereby, network operation can be performed efficiently.

A sixteenth aspect of the present invention provides the communication system as defined in the fifteenth aspect of the present invention, wherein the notice is sent in one or more link-change notifying packets.

According to the construction described above, all link-change notices from different kinds of the terminals can be systematically processed by an easy method.

A seventeenth aspect of the present invention provides the communication system as defined in the fifteenth aspect of the present invention, wherein the notice is sent in one or more substitute packets other than the one or more link-change notifying packets.

According to the construction described above, it is not necessary to exclusively transmit one or more link-change notifying packets in order to notice the link-change. Therefore, the burden of transmission and reception can be alleviated, and increase of the amount of traffic along a communication path can be suppressed.

An eighteenth aspect of the present invention provides the communication system as defined in the fifteenth aspect of the present invention, wherein the notice sent in the one or more substitute packets includes one of an ICMP message, information of services available at said terminal, information of a phone number of said terminal, and the network resource reservation information.

According to the construction described above, substitute information for the link-change notice is promised beforehand between each terminal and the management device, so that the terminal can notify the management device that the link has changed, by sending the substitute packet including the substitute information. For example, as the substitute information, the terminal can send a message of ICMP; information of services available at the terminal, if the terminal is a server; telephone number information, if the terminal is an IP phone; or the network resource reservation information. Thereby the terminal can notify the managing device that the link has changed.

A nineteenth aspect of the present invention the communication system as defined in the first aspect of the present invention, the plural switching devices are base stations constituting a wireless LAN, and the link-state detecting unit is operable to detect a change of connection at one of the base stations as a link-up.

According to the construction described above, a network using the wireless LAN can be efficiently operated.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a block diagram illustrating a terminal in a first embodiment of the present invention;

FIG. 2 is a block diagram illustrating a management device in the first embodiment of the present invention;

FIG. 3(a) is a diagram illustrating how a switching device is connected in the first embodiment of the present invention;

FIG. 3(b) is a state diagram illustrating a MAC address table in the first embodiment of the present invention;

FIG. 5(a) is a diagram illustrating how the switching device is connected in the first embodiment of the present invention;

FIG. 5(b) is a state diagram illustrating the MAC address table in the first embodiment of the present invention;

FIG. 6(a) is a diagram illustrating how the switching device is connected in the first embodiment of the present invention;

FIG. 6(b) is a state diagram illustrating the MAC address table in the first embodiment of the present invention;

FIG. 6(c) is a structural diagram of a packet in the first embodiment of the present invention;

FIG. 8 (a) is a diagram illustrating how the switching devices are connected in the first embodiment of the present invention;

FIG. 10 is an illustration showing IP addresses and MAC addresses in the first embodiment of the present invention;

FIGS. 11(a) to 11(c) are state diagrams illustrating a MAC address table in the first embodiment of the present invention;

FIGS. 14(a) to 14(c) are state diagrams illustrating a MAC address table in the first embodiment of the present invention;

FIG. 19(a) is a state diagram illustrating a network resource management table in the second embodiment of the present invention;

FIGS. 19(b) and 19(c) are state diagrams illustrating a resource reservation table in the second embodiment of the present invention;

FIG. 20 is a state diagram illustrating the network resource management table in the second embodiment of the present invention;

DETAILED DESCRIPTION OF THE PREFERRED EMBODIMENTS

Figure 4:
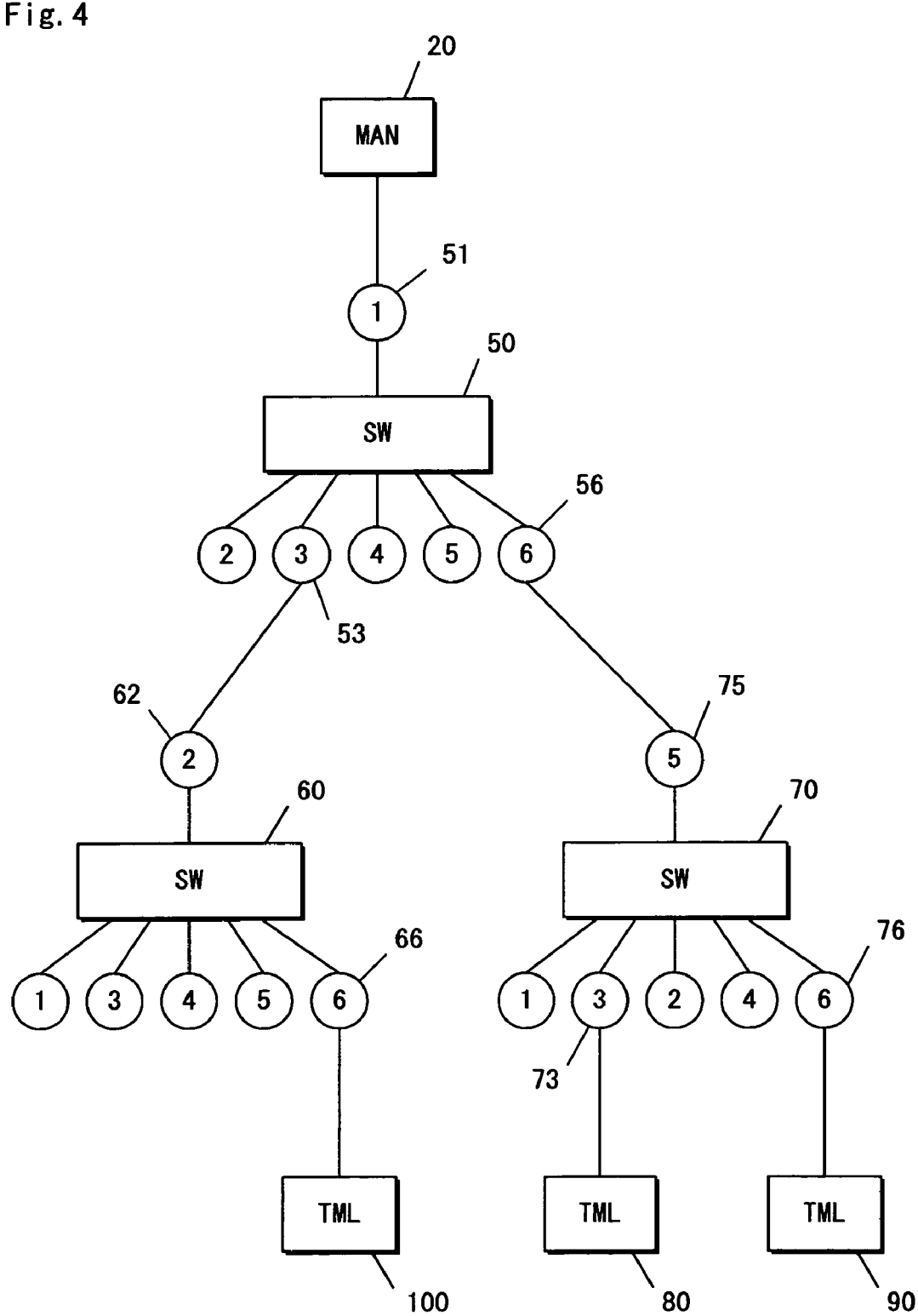
FIG. 4 is a connection diagram illustrated by configuration information in the first embodiment of the present invention.

Hereinafter, a description is given of embodiments of the invention with reference to the accompanying drawings.

First Embodiment

FIG. 1 is a block diagram illustrating a terminal in a first embodiment of the present invention, and FIG. 2 is a block diagram illustrating a management device of the same.

As shown in FIG. 1, a terminal 10 of the present embodiment has the following elements. A packet sending unit 11 transmits a packet to the outside. A packet receiving unit 12 receives a packet from the outside.

Here, as shown in FIG. 6(c), fields which store a destination MAC address and a source MAC address are provided in the packet.

The MAC address is uniquely given to every device (a management device, a switching device, a terminal, etc.) which composes a network. An example of the MAC address is "00:20:44:00:00:01." Hereinafter, the MAC address of a component with a sign * is shown like "m*", including in a diagram.

In FIG. 1, a link-state detecting unit 13 detects whether the terminal 10 is in a state of a link-up (connection) or in a state of a link-down (disconnection) at a port of a switching device. Here, when the terminal 10 is connected to the switching device with a cable, the link-state detecting unit 13 detects whether the cable (for example, Ethernet (registered trademark) cable) is connected or disconnected at the port of the switching device.

Meanwhile, when the terminal 10 is connected to the switching device with wireless, the link-state detecting unit 13 detects whether the terminal 10 is connected to a wireless side of the switching device (in the present specification, a "port" includes such a "wireless side". That is, the meaning of the "port" in the present specification is wider than a general meaning).

At a moment when the terminal 10 detects a switching device that is a base station, or at a little later, it is preferably regarded that the terminal 10 is connected to the switching device. At a moment when the terminal 10 is handed-over from the switching device or the base station, it is preferably regarded that the terminal 10 is disconnected from the switching device.

When the link-state detecting unit 13 detects a link-up, a configuration-change notifying unit 14 sends a packet to a management device 20, using the packet sending unit 11, and notifies the management device 20 that a network configuration has changed. This notice is performed by multicast or broadcasting.

As shown in FIG. 2, the management device 20 has the following elements. A packet sending unit 21 sends a packet to the outside. A packet receiving unit 22 receives a packet from the outside.

When a notice is received from the terminal 10, an information acquiring unit 23 acquires information of a MAC address concerning each port of a switching device. All the switching devices of the present embodiment are management-functioning switching hubs or bridges. Therefore, the information acquiring unit 23 acquires the information of the MAC address using an SNMP. The information acquiring unit 23 acquires the information of the MAC address only from switching devices which exist on a path from the port connecting to a terminal which has sent the notice to the management device 20.

The information acquiring unit 23 does not acquire information of the MAC address table of all switching devices. However, the information acquiring unit 23 acquires information of the MAC address table of only the switching devices on a path from a switching device to which the management device 20 is connected to a switching device to which a terminal that has sent the change notice is connected. Hence, when the management device 20 receives the change notice from the terminal, the information acquiring unit 23 acquires first the information of the MAC address table of the switching device to which the management device 20 is connected. Next the information acquiring unit 23 checks which switching device the terminal is connected to. Then the information acquiring unit 23 acquires the information of the MAC address table of the switching device to which the terminal is connected. The above process of checking and acquiring is performed repeatedly until the process reaches the terminal. Thereby, the configuration information can be updated only with information of a minimum number of the MAC address tables.

Based on the latest MAC address information that the information acquiring unit 23 acquired, a configuration information generating unit 24 generates configuration information of switching devices and terminals which compose the network.

As shown in FIG. 3(a), a switching device 50 has a MAC address table 59, as well as a plurality of ports besides the second port 52 (in the example of FIG. 3(a), six ports). The numerical symbol in a circle mark which indicates a port is the number of a port.

The MAC address table 59 stores each port number and the transmitting source address corresponding to the port number, as shown in FIG. 3(b). The transmitting source MAC address corresponding to each port number may be null, may be only one, and may be two or more.

The configuration information that the configuration information generating unit 24 generates can be illustrated, for example, as in FIG. 4. In the example shown in FIG. 4, the management device 20 is connected to a first port 51 of the switching device 50, a third port 53 of the switching device 50 is connected to a second port 62 of a switching device 60, and a sixth port 66 of the switching device 60 is connected to a terminal 100. A sixth port 56 of the switching device 50 is connected to a fifth port 75 of a switching device 70, a third port 73 of the switching device 70 is connected to a terminal 80, and a sixth port 76 of the switching device 70 is connected to a terminal 90.

The illustrated configuration information is merely an example. The configuration information may be changed variously, as long as a network connection relation is grasped uniquely.

A process in which the configuration information is composed is now explained, using FIG. 3 and FIG. 5 to FIG. 8. As shown in FIG. 3(a), in a state where no terminal is connected to the switching device 50, no transmitting source MAC addresses of each port are stored in the MAC address table 59, as shown in FIG. 3(b).

As shown in FIG. 5(a), the terminal 10 is now connected to the second port 52. At this moment, the link-state detecting unit 13 of the terminal 10 detects a link-up.

However, as shown in FIG. 5(b), the content of the MAC address table 59 is the same as the state of FIG. 3(b), until the terminal 10 sends a packet of the change notice to the switching device 50.

As an arrow N1 of FIG. 6(a) shows, when the terminal 10 sends a packet and the packet reaches the switching device 50, the content of the MAC address table 59 is changed as shown in FIG. 6(b). The MAC address "m10" of the terminal 10 is set as a transmitting source MAC address regarding the second port 52.

Figures 7A, 7B, 7C:
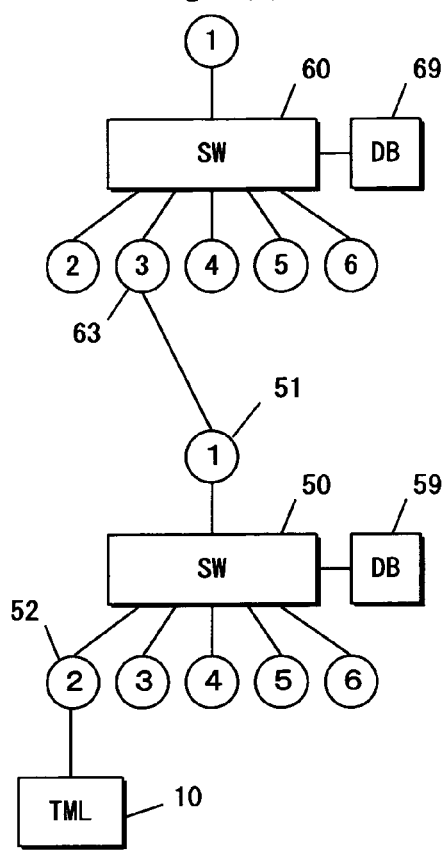
FIG. 7(a) is a diagram illustrating how switching devices are connected in the first embodiment of the present invention.
FIGS. 7(b) and 7(c) are state diagrams illustrating MAC address tables in the first embodiment of the present invention.

As shown in FIG. 7(a), a third port 63 of the switching device 60 is now connected to the first port 51 of the switching device 50. At this moment, as shown in FIG. 7(b), no MAC addresses are stored in a MAC address table 69.

Figures 8A, 8B, 8C:
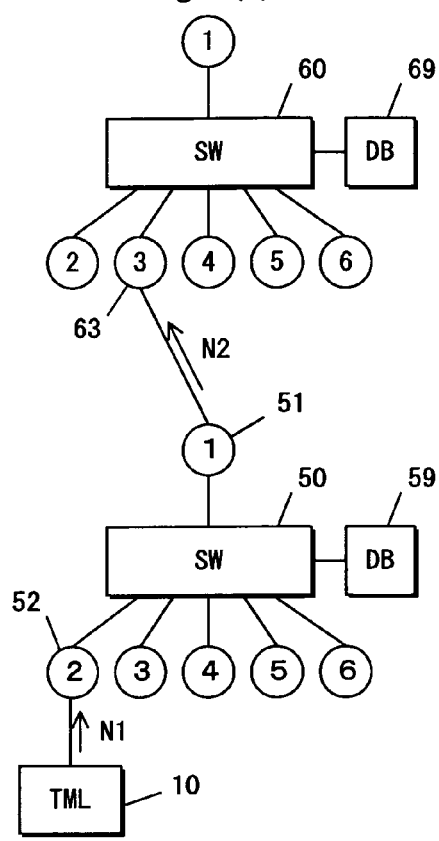
FIGS. 8(b) and 8(c) are state diagrams illustrating the MAC address tables in the first embodiment of the present invention.

As an arrow N1 of FIG. 8(a) shows, when the terminal 10 sends a packet, the packet is transmitted as an arrow N2 shows and reaches the switching device 60, the content of the MAC address table 59 is set by adding the MAC address "m60" of the switching device 60, which is a connection end of the first port 51, as shown in FIG. 8(c). Simultaneously, the contents of the MAC address table 69 are changed as shown in FIG. 8(b). The MAC address "m10" of the terminal 10 and the MAC address "m50" of the switching device 50 are set as the transmitting source address regarding the third port 63.

Figure 9:
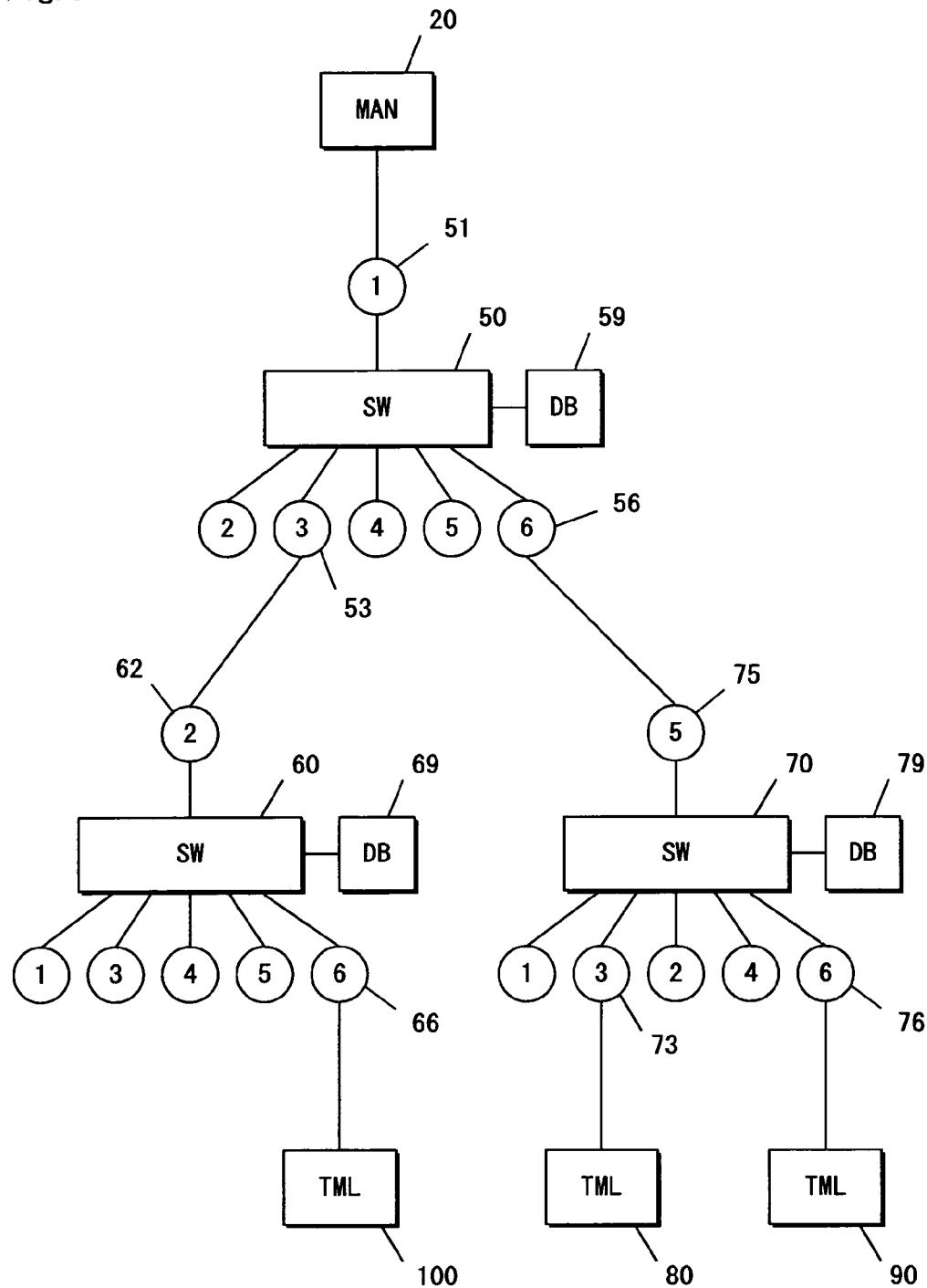
FIG. 9 is an illustration showing a network in the first embodiment of the present invention.

When a process described above is repeated, a network as shown in FIG. 9 is composed. Here, an IP address and a MAC Address of each component are exemplified as in FIG. 10.

At this time, the contents of the MAC address table 59 are shown in FIG. 11(a), the contents of the MAC address table 69 are shown in FIG. 11((b), and the contents of a MAC address table 79 are shown in FIG. 11(c).

A further detail of the MAC table is now explained for the third port 53, as an example, as shown in FIG. 11(a). The MAC address of the switching device 60 and the MAC address of the terminal 100 are stored in the third port 53. Here, the third port 53 is connected to the second port 62 of the switching device 60 directly, and is connected to the terminal 100 at the "point" (the sixth port 66) via the switching device 60.

In the present embodiment, it is not distinguished whether the connection at the third port 53 is direct or indirect via some switching device.

In short, a MAC address existing in a corresponding port number means that a device storing the MAC address exists in the "point" of the corresponding port (at some position in this direction). Thereby, the management device 20 can know the path that leads to each switching device or each terminal.

Figure 12:
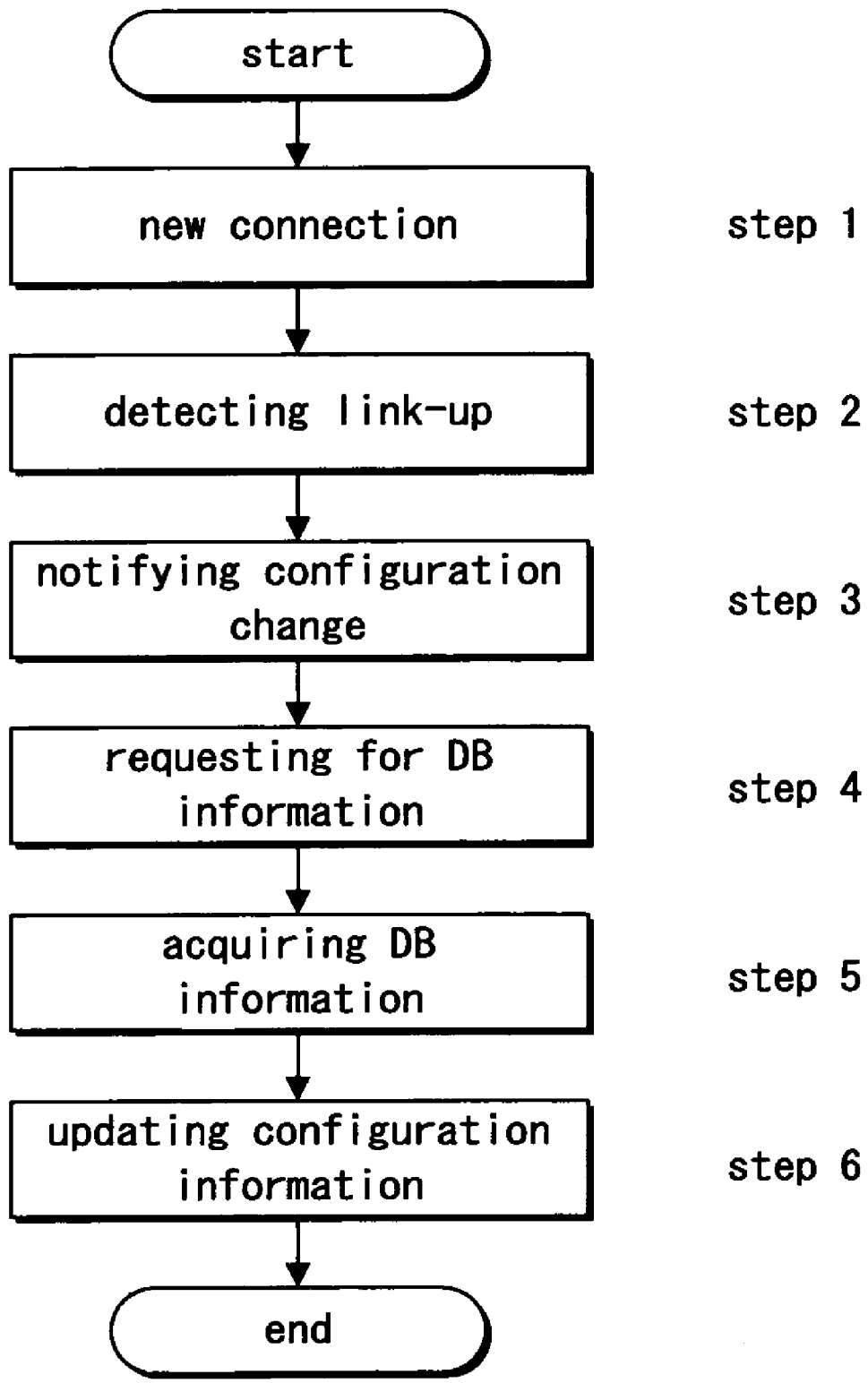
FIG. 12 is a flowchart illustrating process in the first embodiment of the present invention.

A process after new connection is made until configuration information is updated is now explained using FIG. 12.

At Step 1, the terminal 10 is connected to a new port. At Step 2, the link-state detecting unit 13 of the terminal 10 detects a link-up.

At Step 3, the configuration-change notifying unit 14 of the terminal 10 transmits a packet of change notice to the management device 20. This transmission is performed by multicast or broadcasting. The MAC address table of the switching device in the path to which the packet is transmitted is changed.

At Step 4, the management device 20 sends information request to the switching device in connection with this path. At Step 5, the latest information of the MAC address table is transmitted in the opposite direction of the information request, and the information acquiring unit 23 acquires the information.

At Step 6, the configuration information generating unit 24 updates the configuration information based on the latest information that the information acquiring unit 23 has acquired.

Operation at the time when the terminal 100 moves is explained with reference to FIG. 13. First, as the broken line of FIG. 13 shows, assume that the terminal 100 is connected with the sixth port 66 of the switching device 60.

At this time, the contents of the MAC address table 59 are shown in FIG. 11(*a*), the contents of the MAC address table 69 are shown in FIG. 11(*b*), and the contents of the MAC address table 79 are shown in FIG. 11(*c*).

Figure 13:
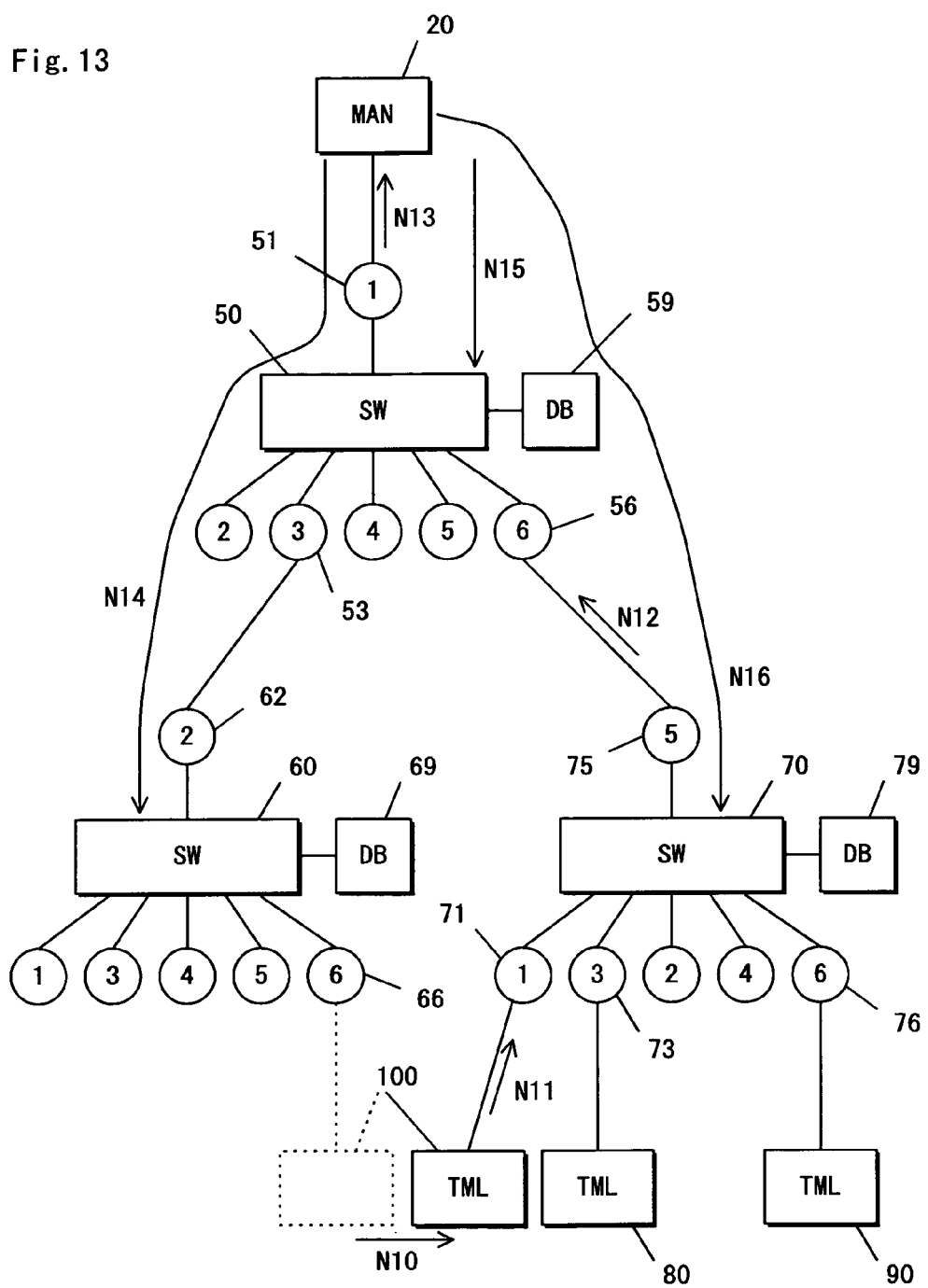
FIG. 13 is a communication procedure explanatory diagram in the first embodiment of the present invention.

As shown in FIG. 13, assume that, from the above state, the terminal 100 links down from the sixth port 66, moves in the direction of an arrow N10, and links up at a first port 71.

Only by the link-up, the contents of the MAC address tables 59, 69, and 79 do not change but remain as same as in FIG. 11.

Next, the terminal 100 transmits a packet of the change notice by multicast or broadcasting.

By this transmission, the contents of the MAC address tables 59, 69, and 79 are changed, as shown in FIG. 14.

As it is clear when FIG. 11 is compared with FIG. 14, the MAC address "m100" is deleted from the third port 53 of table 59, the MAC address "m100" is added to the sixth port 66 of the MAC address table 69, the MAC address "m100" is added to the first port 71 of the MAC address table 79, the MAC address "m100" is deleted from the fifth port 75.

Next, the information acquiring unit 23 demands the latest information transmission of the switching devices 50, 60, and 70, as shown with arrows N14, N15, and N16. Responding to the demand, the switching devices 50, 60, and 70 transmit the contents of the MAC address tables 59, 69, and 79, respectively, to the information acquiring unit 23 in the opposite direction of these arrows.

When the information acquiring unit 23 receives these items of transmission, the configuration information generating unit 24 updates the configuration information based on these items of transmission.

In the prior communication system, it is sufficient to detect possible network failure. The prior communication system does not need to know immediately that a terminal moves, therefore, the prior communication system does not possess any means to detect the moved terminal.

As shown in FIG. 13, in a state immediately after the terminal 100 links up to the first port 71 and before the terminal 100 transmits the packet of the change notice, the MAC address table of the switching device is not updated; therefore the management device 20 by no means knows whether the terminal 100 has moved. At this time, when the information acquiring unit 23 requests the MAC address tables 59, 69, and 79 for information transmission, the management device 20 recognizes incorrectly that the terminal 100 is connected to the sixth port 66.

Incidentally, by using an SNMP trap, the management device 20 can detect the link-down of the sixth port 66, and the link-up of the first port 71. However, there is also a problem in this case; the management device 20 cannot distinguish that the terminal 100 has moved to link up to the first port 71 and that another terminal different from the terminal 100 links up to the first port 71.

In order to avoid the above problem, it is considered that the management device 20 which has received the notice of an SNMP trap transmits a broadcasting packet which requires a response to all the terminals instead of a switching device. However, since a large number of terminals may generally exist, huge quantities of the broadcasting packets are resultantly to be transmitted, pressing the band that other communications use.

In the present embodiment, when the terminal 100 detects a link-up, the terminal 100 itself which has linked up (usually only one terminal) sends out a change notice to the management device 20. Therefore, updating a MAC address table of a switching device, and detecting a moved terminal by the management device 20 (change of configuration information) are enabled to be performed simultaneously.

Sending the change notice by multi-cast (or broadcasting), the MAC address tables of all switching devices which compose a network can be updated.

When a terminal moves (new connection), the place (or the direction connected) of the terminal can be taught to all switching devices, therefore, the connection place can be pinpointed promptly. This is effective in a communication system which needs to manage topology information precisely.

In the above explanation, when a link-up is detected, the terminal 100 sets and transmits the link detection notice in a link-change notifying packet.

However, the notice of link detection does not necessarily need to use the link-change notifying packet. That is, substitute information for a link change notice is promised in advance between each terminal and a management device; and by transmitting a substitute packet including the substitute information, the terminal can notify that the link has been changed. For example, instead of transmitting the link-change notifying packet, the terminal may perform the so-called ping (TCP/IP network diagnostic program called Packet Internet Groper), and may send the substitute packet which includes an ICMP message as substitute information. When the terminal is a server, the terminal can notify that the link has changed by transmitting a substitute packet which includes information of services available at the server as substitute information. When the terminal is an IP phone, the terminal can notify that the link has changed by transmitting a substitute packet which includes telephone number information of the IP phone as substitute information.

Another substitute packet which includes a link change notice in a part of the above-mentioned substitute information may also be transmitted.

Such a substitute packet is transmitted by broadcast or multi-cast.

Thus, instead of transmitting the link-change notifying packet, promising in advance the substitute information for a link change notice between each terminal and a management device, a substitute packet including the substitute information may preferably be transmitted. Thereby, a transmission path is not occupied for transmitting exclusively the link-change notifying packet.

Second Embodiment

Figure 15:
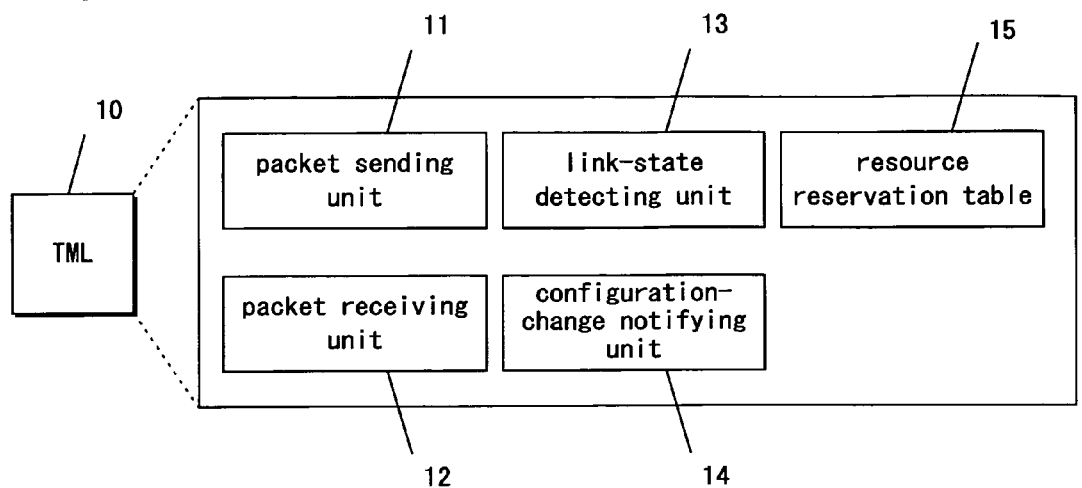
FIG. 15 is a block diagram illustrating a terminal in a second embodiment of the present invention.
Figure 16:
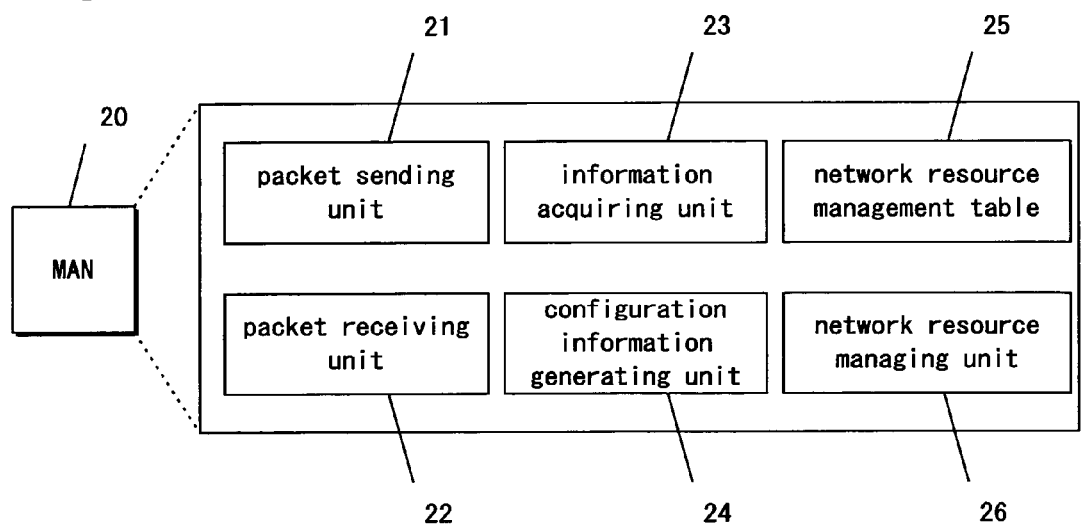
FIG. 16 is a block diagram illustrating a management device in the second embodiment of the present invention.

FIG. 15 is a block diagram, illustrating a terminal of the second embodiment of the present invention. FIG. 16 is a block diagram illustrating a management device of the same. In FIGS. 15 and 16, the same symbols are attached to configuration elements that are same as in FIGS. 1 and 2, and the explanation thereof is omitted.

As shown in FIG. 15, a terminal 10 of the present embodiment has a packet sending unit 11, a packet receiving unit 12, a link-state detecting unit 13, a configuration-change notifying unit 14, and a resource reservation table 15.

When the link-state detecting unit 13 detects a link-up, the configuration-change notifying unit 14 transmits a packet to the management device 20, and notifies that network configuration has changed using the packet sending unit 11. Process of the processing is the same as that of the first embodiment of the present invention. Using the packet sending unit 11, the configuration-change notifying unit 14 notifies a management device 20 of the network resource reservation information stored in the resource reservation table 15. The notification is performed by a multicast or broadcast. The detailed example of the resource reservation table 15 is mentioned later.

As shown in FIG. 16, the management device 20 of the present embodiment has a packet sending unit 21, a packet receiving unit 22, an information acquiring unit 23, a configuration information generating unit 24, a network resource management table 25, and a network resource managing unit 26.

The information acquiring unit 23 acquires MAC Address information regarding each port of the switching device, when the information acquiring unit 23 receives notice telling that a network configuration has changed from the terminal 10. Every switching device of present embodiment is a management-functioning switching hub or a bridge, and the information acquiring unit 23 acquires MAC Address information using the SNMP. The information acquiring unit 23 acquires MAC Address information only from a switching device, which exists on a path reaching the management device 20 from a port connecting the terminal that has sent the notice. A process that acquires the MAC Address information is the same as that of the first embodiment of the present invention, and the explanation is omitted.

The configuration information generating unit 24 generates configuration information of the switching device and terminal composing the network, based on the newest MAC Address information, which the information acquiring unit 23 has acquired. A process of generating the configuration information and the generated result are the same as those of the first embodiment of the present invention, and the explanation thereof is omitted.

When the network resource managing unit 26 receives a notice of the network resource reservation information from the terminal 10, the network resource managing unit 26 reviews the contents, judges the availability of required network resource reservation, and generates the reservation availability information. Based on the generated reservation availability information, the network resource reservation information of the network resource management table 25 is updated. Furthermore, the network resource managing unit 26 notifies the terminal 10 and the terminal of the communication's partner of the generated availability information.

Next, a process of the network resource reservation is explained using FIGS. from 17 to 20. In the following explanation, assume that the bandwidth between each terminal and a switching device and between the switching devices is 10 Mbps.

Figure 17:
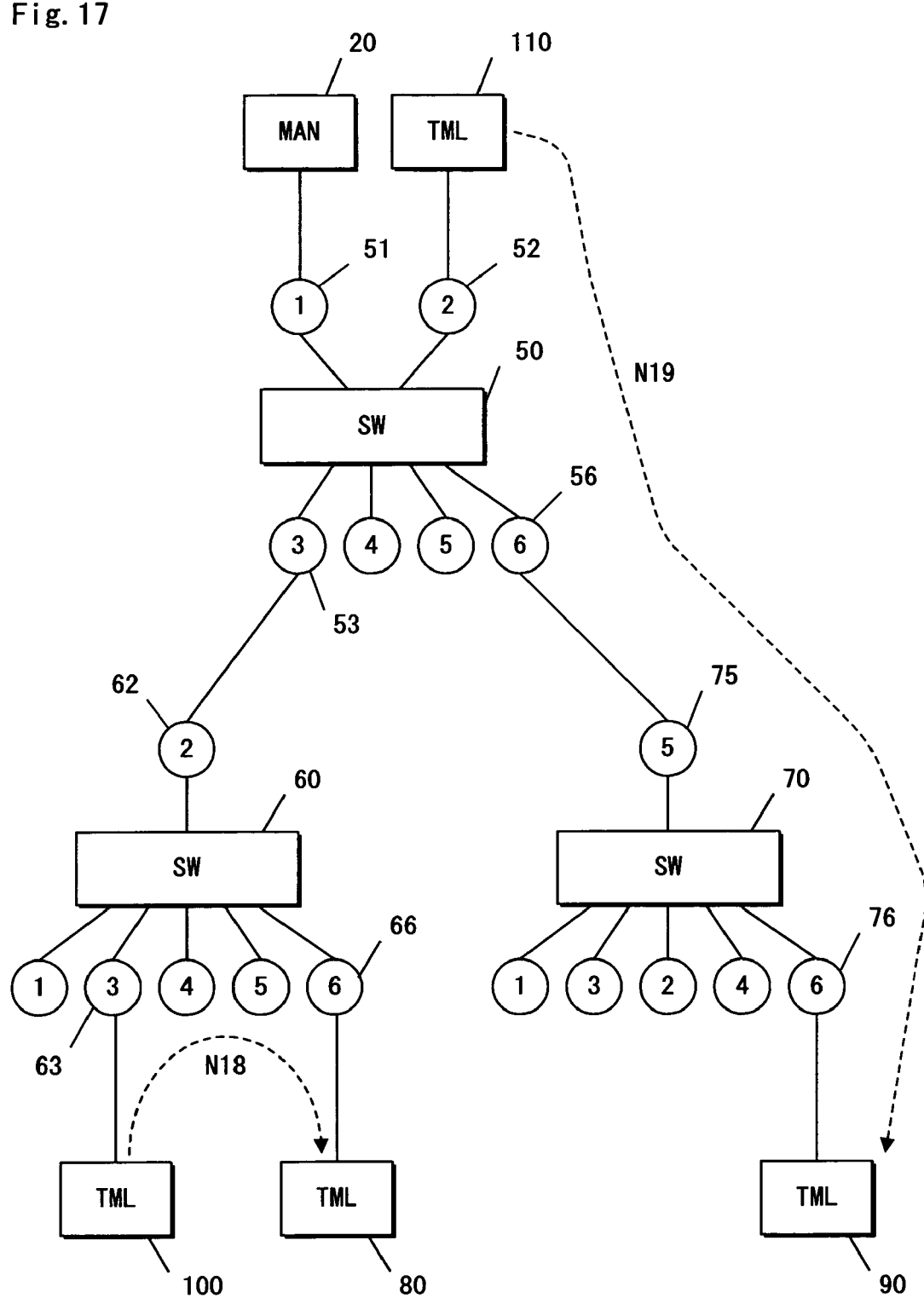
FIG. 17 and FIG. 18 are illustrations showing communication paths on a network in the second embodiment of the present invention.

FIG. 17 is an illustration showing communication paths on a network of the present embodiment. In FIG. 17, assume that a terminal 100 connected to the third port 63 of a switching device 60 reserves a bandwidth of 6 Mbps in order to transmit packets to a terminal 80 connected to the sixth port 66 of the switching device 60 in a direction that an arrow N18 indicates. Also assume that a terminal 110 connected to the second port 52 of a switching device 50 reserves a bandwidth of 6 Mbps in order to transmit packets to a terminal 90 connected to the sixth port 76 of a switching device 70 in a direction that an arrow N19 indicates.

At this time, network resource reservation information as indicated in FIG. 19(a) is stored in a resource reservation table 15 of the terminal 100. The resource reservation table 15 is comprised of a "reservation ID" field indicating a reservation number, a "sending source" field indicating a sending source of the packet, a "destination" field indicating a destination of the packet, a "communication path" field indicating a communication path of the packet, and a "reservation bandwidth" field indicating a bandwidth which is used for the packet transmission. In the present example, the "reservation ID" is "2". In the "sending source" field, a MAC address "m100" indicating the sending terminal is stored, and in the "destination" field, a MAC address "m80" indicating the destination terminal is stored. Furthermore, in the "communication path" field, the MAC address "m100" of the sending terminal, a MAC address "m60" of a switching device on the communication path, and the MAC address "m80" of the destination terminal are listed and stored in the order of the communication path. A bandwidth "6 Mbps" is stored in the "reservation bandwidth" field.

In a resource reservation table 15 of another sending terminal 110, the network resource reservation information indicated in FIG. 19(b) is stored as "reservation ID=1".

Reservation of these network resources is performed, using the RSVP, by the configuration-change notifying unit 14, as shown in FIG. 15, of each terminal (in the above-mentioned example, the terminal 80 and the terminal 90).

The management device 20 receives a reservation notice of the network resource from each sending source, and manages the network resource of the whole network. In the present example, as shown in FIG. 19(c), a "reservation ID" field, a "sending source" field, a "destination" field, a "communication path" field, and a "reservation bandwidth" field are prepared for the network resource management table 25 of the management device 20, as in the resource reservation table 15. The reservation number is stored in the "reservation ID" field; the MAC addresses indicating each terminal are stored in the "sending source" and the "destination" respectively; and the MAC address of the sending terminal, the MAC address of the switching device on the communication path, and the MAC address of the destination terminal are listed and stored in the "communication path" field in the order of the communication path. The bandwidth, which is used for the packet communication, is stored in the "reservation bandwidth".

The network resource managing unit 26 looks at all the reservation state of FIG. 19(c), and manages the network resource so as to prevent conflict in any communication path. The conflict of communication is not produced at any section of the paths of FIG. 17.

Figure 18:
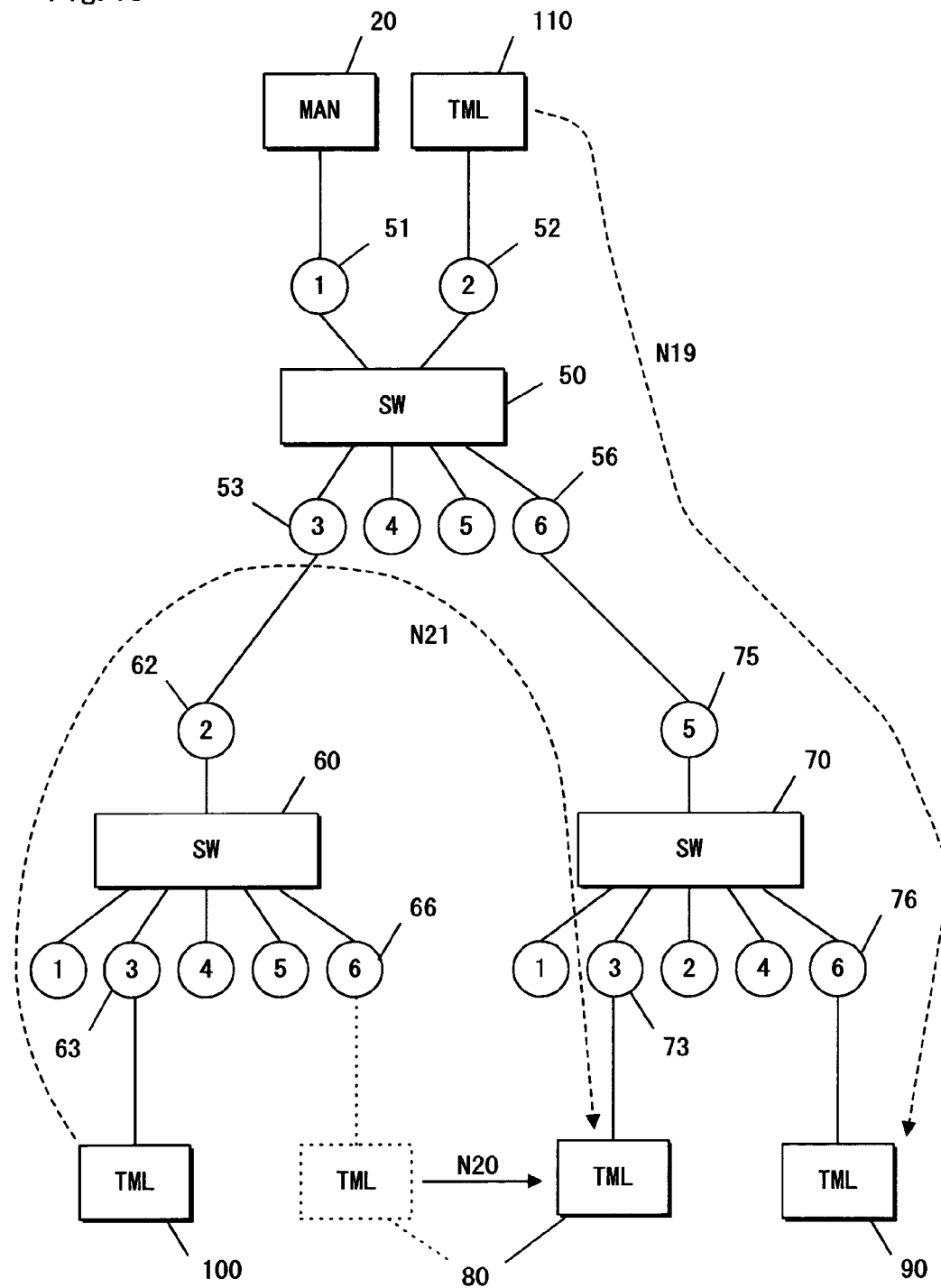

Next, FIG. 18 is an illustration showing communication paths on the network of the present embodiment. As shown in the diagram, assume that the terminal 80 moves in the direction that an arrow N20 indicates and the connection changes to the switching device 70 from the switching device 60. Thus, assume that the path from the terminal 100 to the terminal 80 has changed to an arrow N21 of FIG. 19 from the arrow N18 of FIG. 17. Then, the link-state detecting unit 13 of the terminal 80 detects the change of the link state; the configuration-change notifying unit 14 notifies that the network configuration has changed; and the configuration information generating unit 24 of the management device 20 generates new network configuration information.

The configuration-change notifying unit 14 of the terminal 80 secures the network resource using the RSVP. After updating the network resource reservation information of the resource reservation table 15 based on the result, the configuration-change notifying unit 14 sends the updated network resource reservation information to the management device 20. Then, the management device 20 deletes the unnecessary network resource of the "reservation ID=2" shown in FIG. 19(c) following the network configuration change, and sends a notice of the deletion to the terminal that is indicated by the MAC address of the "sending source" of "reservation ID=2" and the terminal that is indicated by the MAC address of the "destination." Then, the management device 20 tries to secure a new network resource of "reservation ID=3" shown in FIG. 20, regarding a path that an arrow N21 of FIG. 18 indicates.

At this time, the "reservation ID=3" shares the path between the switching device 50 and the switching device 70 with the "reservation ID=1" that has the reservation. The reservation bandwidth already secured for the "reservation ID=1" is 6 Mbps, and the reservation bandwidth to be newly reserved for the "reservation ID=3" is 6 Mbps; therefore, the sum of these bandwidths amounts to 12 Mbps. Since the sum exceeds the bandwidth of 10 Mbps for the path, the conflict will occur if the network resource managing unit 26 permits sharing. Consequently, the network resource managing unit 26 does not permit the new reservation for "reservation ID=3" at this moment. The new reservation is to be secured after the communication of "reservation ID=1" ends and the path between the switching device 50 and the switching device 70 is released.

Thus, in the communication system of the present embodiment, the conflict on a network is always avoided.

A data storing form of the resource reservation table 15 and the network resource management table 25 shown in FIG. 19, and a data storing form of the network resource management table 25 shown in FIG. 20 are examples, and the present invention is not limited to the examples. In short, when a sending source, a destination, a path, and a reservation band that are related to one network resource reservation can be identified by simple identification numbers or symbols, and the network resource can be managed using the simple identification numbers or symbols, then, the data storing form need not be of any particular kind.

Figure 21:
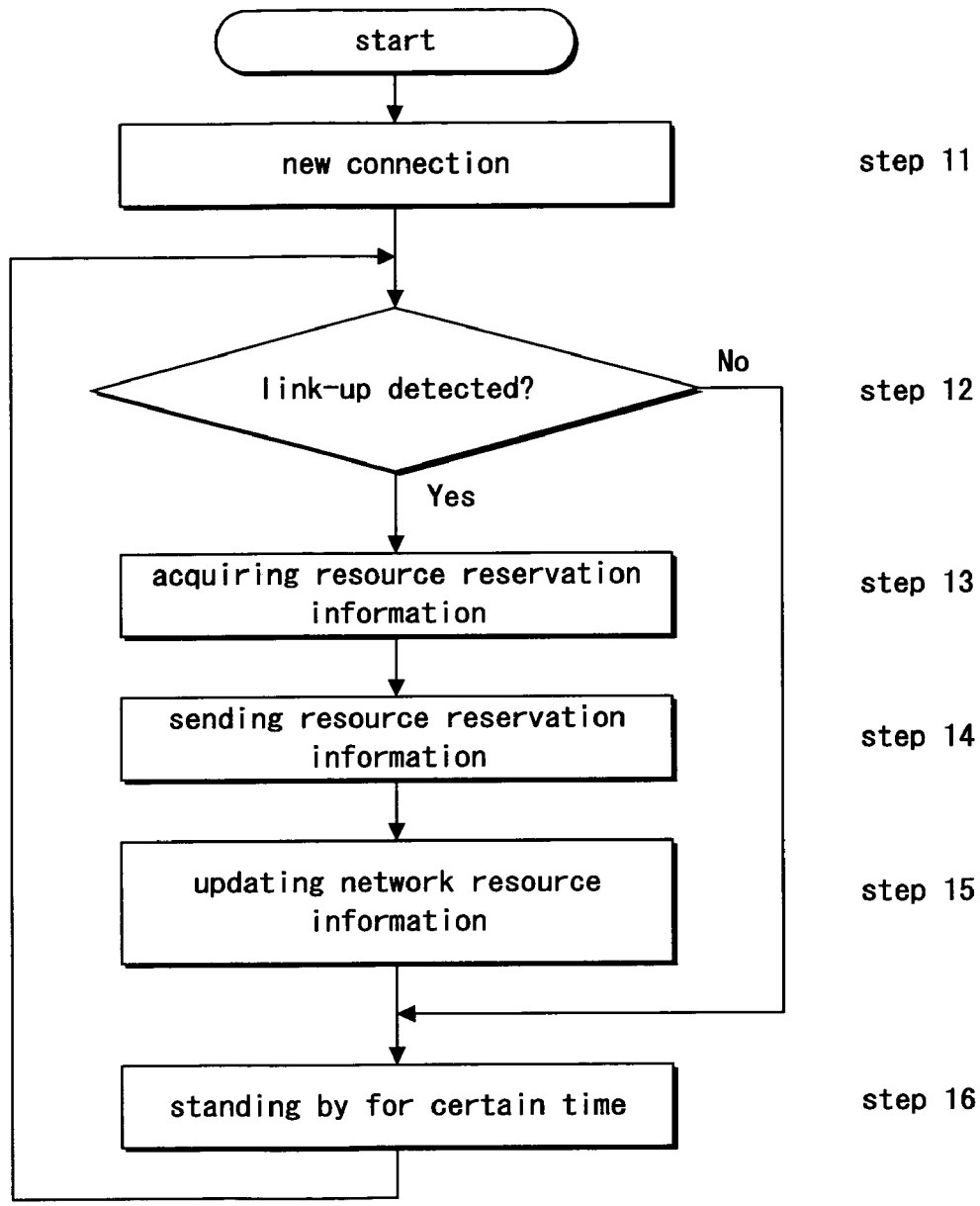
FIG. 21 is a flowchart illustrating process in the second embodiment of the present invention.
Figure 22:
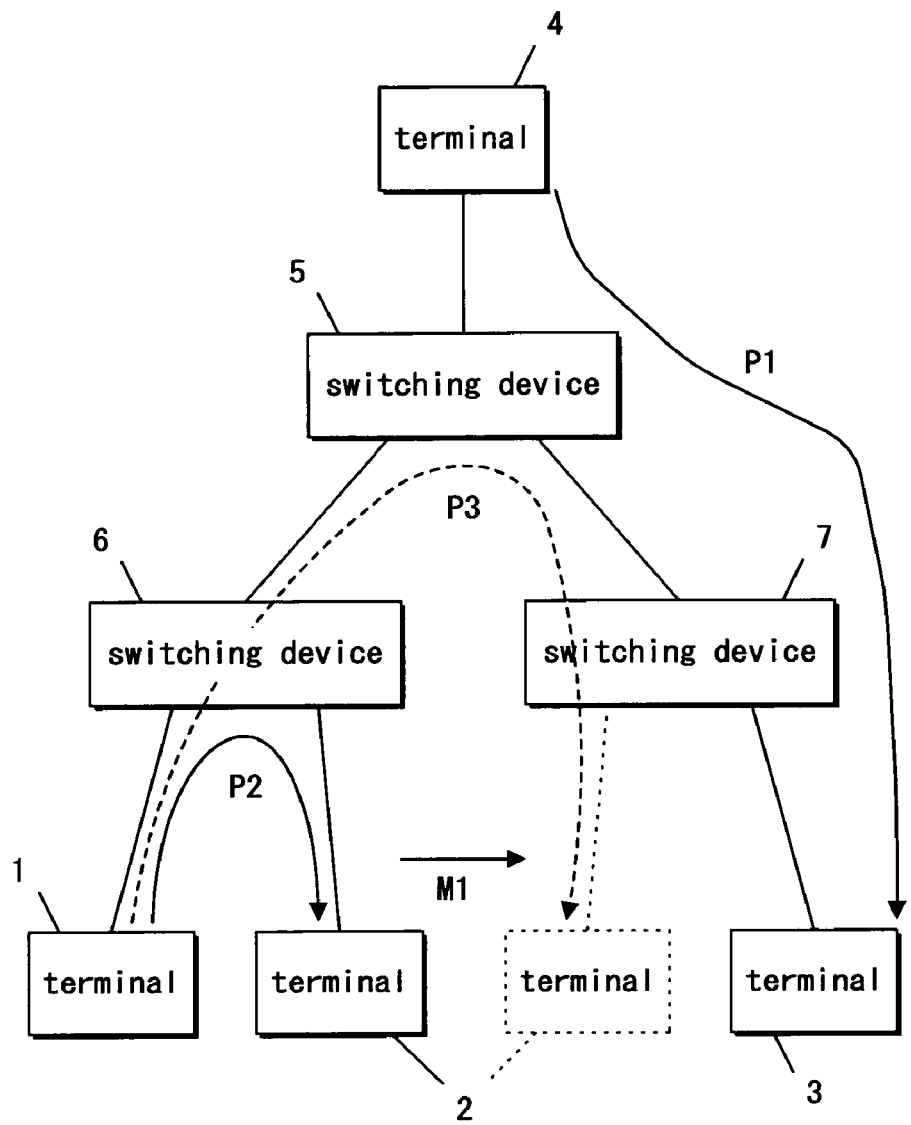
FIG. 22 and FIG. 23 are illustrations showing communication paths on a prior network.
Figure 23:
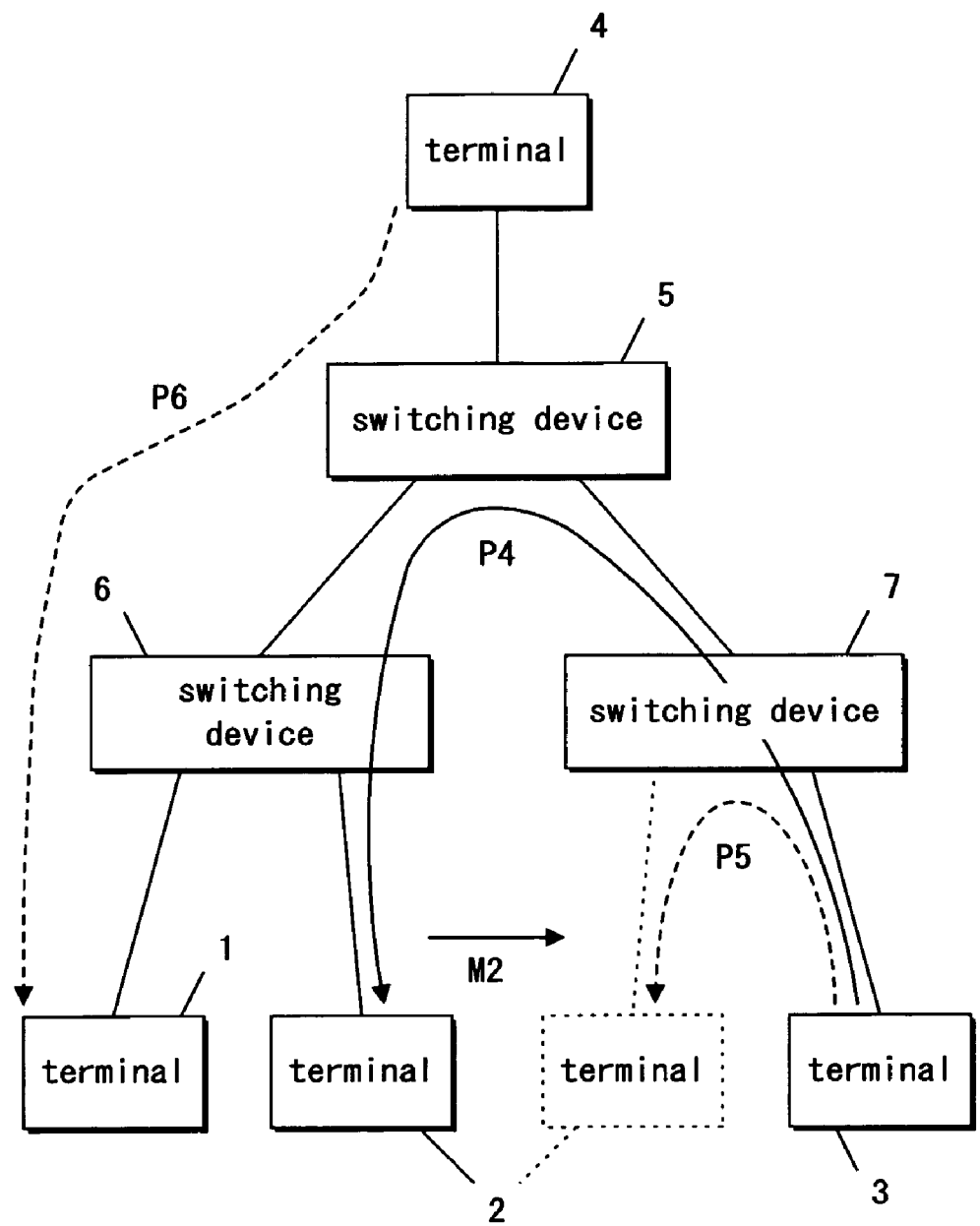

FIG. 21 is a flowchart illustrating process in the communication system of the present embodiment. According to FIG. 21, the process in the communication system of the present embodiment, after a new connection is made until a network resource is updated, is explained with reference to FIG. 18.

At Step 11, the terminal 80 moves and is connected to a new port. At Step 12, the link-state detecting unit 13 of the terminal 80 detects a new link-up.

At Step 13, the terminal 80 acquires resource reservation information of a network resource needed newly, and stores the information in the resource reservation table 15.

At Step 14, the configuration-change notifying unit 14 transmits the resource reservation information stored in the resource reservation table 15 to the management device 20.

At Step 15, the network resource managing unit 26 of the management device 20 generates reservation availability information, after judging the reservation availability of the network resource for the new request. Based on the generated reservation availability information, the network resource managing unit 26 updates the network resource reservation information of the network resource management table 25. Simultaneously, the network resource managing unit 26 sends a notice of the reservation availability information to a terminal shown by a MAC address of the "sending source," and a terminal shown by a MAC address of the "destination."

At Step 16, after the network resource managing unit 26 stands by for a certain period of time, the network resource managing unit 26 returns control to Step 12 and checks whether there is any new link-up.

In Step 12, when a new link-up is detected, control is moved from Step 13 to Step 15. When a new link-up is not detected, control is moved to Step 16.

The communication system of the present embodiment manages the network by detecting whether there is any new link-up for every certain period of time in this way.

When a link-up is detected, the terminal 80 according to the present embodiment includes a link detection notice to a link-change notifying packet, and transmits the packet.

However, in the present embodiment, as well as in the first embodiment of the present invention, this link detection notice does not need to use the link-change notifying packet. That is, promising substitute information for the link change notice in advance between each terminal and the management device, the terminal may transmit a substitute packet that includes the substitute information; thereby the terminal can notify that the link has been changed.

For example, instead of transmitting a link-change notifying packet, a terminal may perform the so-called "ping" and may send a substitute packet which contains an ICMP message as substitute information. When a terminal is a server, the server can notify that a link has been changed by transmitting a substitute packet which includes service information as substitute information that the server can offer. When a terminal is an IP phone, the IP phone can notify that a link has been changed by transmitting a substitute packet which includes telephone number information of the IP phone as substitute information. A terminal can also notify that a link has been changed by transmitting network resource reservation information.

As another example, another substitute packet which includes a link change notice in a part of the above-mentioned substitute information may be transmitted.

Such substitute packet is transmitted by broadcast or multicast.

Thus, instead of transmitting a link-change notifying packet, any kinds of substitute information for a link change notice is promised in advance between each terminal and management device, and the substitute packet including the substitute information may be transmitted. By such a scheme, a transmission path is preferably not occupied due to transmitting such an exclusive packet.

Third Embodiment

A communication system according to a third embodiment of the present invention comprises a plurality of the terminal 10 and one or more switching devices shown in FIG. 15. Therefore, the communication system does not possess any management device 20 as shown in FIG. 18.

Operation of the present embodiment is explained using FIG. 15 and FIG. 18, assuming that the management device 20 of FIG. 18 is omitted.

In FIG. 18, the terminal 80 is supposed to move in the direction shown by the arrow N20, and that connection has been changed from the switching device 60 to the switching device 70. Then, the link-state detecting unit 13 of the terminal 80 detects change of a link state, and the configuration-change notifying unit 14 transmits a notice that the network configuration has changed to other terminals on the network (in this example, the terminal 90, the terminal 100, and the terminal 110). The configuration-change notifying unit 14 of the terminal 80 also sends the network resource reservation information stored in the resource reservation table 15, to the other terminals on the network via the packet sending unit 11.

Based on the network resource reservation information stored in the resource reservation table 15, the configuration-change notifying unit 14 of the terminal 80 performs the RSVP, and secures a network resource.

The notice of link-state change and the notice of network resource reservation information mentioned above are sent by multi-cast or broadcast.

Thus, in the communication system of the present embodiment, even though the management device 20 is not installed, all terminals can share the network configuration information and the network resource reservation information at every moment. Thereby each terminal can manage the network in an equal position.

In the present embodiment, as well as in the first embodiment or the second embodiment of the present invention, other substitute packets may be used for transmission of a new link-up detection notice, without exclusively using a link-change notifying packet.

The communication system of the present embodiment is preferable as a simple and small-scale communication system.

As mentioned above, when a terminal moves, a new link-up is detected, network configuration information is updated immediately based on the new link-up information, and thereby the network resource is effectively used. Various applications are available, unless the purpose of the present invention is not deviated.

According to the present invention, even when a terminal moves, network configuration information that a management device holds is immediately made to agree with the actual network configuration, thereby the network can be well managed, effectively using the network resource thereof.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A communication system comprising:
   plural switching devices, each comprising plural ports;
   at least one terminal operable to be connected to any of the plural ports of said plural switching devices; and
   a management device comprising a configuration information generating unit operable to generate configuration information of a network composed of said plural switching devices and said at least one terminal,
   wherein each of said plural switching devices further comprises a MAC address table operable to store MAC address information for each of the plural ports, and
   wherein at least one of said at least one terminal comprises:
   a packet receiving unit operable to receive a packet;
   a packet sending unit operable to send a packet;
   a link-state detecting unit operable to detect a link-up for each of said plural switching devices; and
   a configuration-change notifying unit operable, when the link-state detecting unit detects a link-up, to send a notice of a change of a network configuration to said management device via the packet sending unit.

2. The communication system as defined in claim 1, wherein said configuration-change notifying unit sends the notice in one or more link-change notifying packets.

3. The communication system as defined in claim 1, wherein said configuration-change notifying unit sends the notice in one or more substitute packets other than link-change notifying packets.

4. The communication system as defined in claim 3, wherein the notice sent in the one or more substitute packets includes one of an ICMP message, information of services available at said terminal, and information of a phone number of said terminal.

5. The communication system as defined in claim 1, wherein said configuration-change notifying unit sends the notice by at least one of a multi-cast and a broadcast.

6. The communication system as defined in claim 1,
   wherein said management device comprises an information acquiring unit operable, in receipt of the notice from said terminal, to acquire the MAC address information of the ports from said plural switching devices, and
   wherein the configuration information generating unit updates the configuration information of the network, based on the MAC address information acquired by the information acquiring unit.

7. The communication system as defined in claim 6, wherein the information acquiring unit acquires the MAC address information using an SNMP.

8. The communication system as defined in claim 6, wherein the information acquiring unit acquires the MAC address information only from said plural switching devices that are in a path from said terminal that sent the notice to said management device.

9. A communication system comprising:
   plural switching devices, each comprising plural ports;
   at least one terminal operable to be connected to any of the plural ports of said plural switching devices;
   wherein each of said plural switching devices further comprises a MAC address table operable to store MAC address information for each of the plural ports, and
   at least one of said at least one terminal comprises:
   a packet receiving unit operable to receive a packet;
   a packet sending unit operable to send a packet;
   a link-state detecting unit operable to detect a link-up for each of plural switching devices; and
   a configuration-change notifying unit operable, when said link-state detecting unit detects a link-up, to output a notice of network configuration change via said packet sending unit.

10. The terminal as defined in claim 9, wherein said configuration-change notifying unit sends the notice of the network configuration change by at least one of a multi-cast and a broadcast.

11. A communication system comprising:
plural switching devices, each comprising plural ports; and
at least one terminal operable to be connected to any of the plural ports of said plural switching devices,
wherein at least one of said at least one terminal comprises:
a packet receiving unit operable to receive a packet;
a packet sending unit operable to send a packet;
a link-state detecting unit operable to detect a link-up for each of said plural switching devices;
a resource reservation table operable to store network resource reservation information of said terminal and a communication partner terminal; and
a configuration-change notifying unit operable, when the link-state detecting unit detects a link-up, to send a notice of the network resource reservation information stored in the resource reservation table to the communication partner terminal via the packet sending unit.

12. The communication system as defined in claim 11, wherein said configuration-change notifying unit sends the notice of the network resource reservation information by at least one of a multi-cast and a broadcast.

13. The communication system as defined in claim 11, wherein said configuration-change notifying unit sends the notice of the network resource reservation information only to the communication partner terminal stored in the resource reservation table.

14. The communication system as defined in claim 11, wherein securing network resource based on the network resource reservation information is practiced by an RSVP.

15. A communication system comprising:
plural switching devices, each comprising plural ports;
at least one terminal operable to be connected to any of the plural ports of said plural switching devices; and
a management device comprising a network resource management table operable to store network resource reservation information of a network, the network comprising said plural switching devices and said at least one terminal, said management device further comprising a network resource managing unit operable to manage resources of the network,
wherein at least one of said at least one terminal comprises:
a packet receiving unit operable to receive a packet;
a packet sending unit operable to send a packet;
a link-state detecting unit operable to detect a link-up for each of said plural switching devices;
a resource reservation table operable to store network resource reservation information between said terminal and a communication partner terminal; and
a configuration-change notifying unit operable, when the link-state detecting unit detects a link-up, to send a notice of the network resource reservation information stored in the network resource management table to said management device via the packet sending unit.

16. The communication system as defined in claim 15, wherein the network resource managing unit of said management device is operable to generate reservation availability information indicating availability of a network resource reservation requested by said terminal, after examining the network resource reservation information received from said terminal, the network resource managing unit updates the network resource reservation information stored in the network resource management table, based on the reservation availability information, and the network resource managing unit sends notice of the reservation availability information to said terminal and the communication partner terminal.

17. A terminal comprising:
a packet receiving unit operable to receive a packet;
a packet sending unit operable to send a packet;
a link-state detecting unit operable to detect a link-up for each of plural switching devices;
a resource reservation table operable to store network resource reservation information of said terminal and a terminal of a communication partner of said terminal; and
a configuration-change notifying unit operable, when said link-state detecting unit detects a link-up, to send a notice of the network resource reservation information stored in said resource reservation table to the terminal of the communication partner.

18. The terminal as defined in claim 17, wherein said configuration-change notifying unit sends the notice of the network resource reservation information by at least one of a multi-cast and a broadcast.

19. A communication system comprising:
plural switching devices, each comprising plural ports;
at least one terminal operable to be connected to any of the plural ports of said plural switching devices, and
a management device operable to manage a network including said plural switching devices and said at least one terminal,
wherein each of said plural switching devices further comprises a MAC address table operable to store MAC address information for each of the plural ports,
wherein at least one of said at least one terminal comprises:
a packet receiving unit operable to receive a packet;
a packet sending unit operable to send a packet;
a link-state detecting unit operable to detect a link-up for each of said plural switching devices;
a resource reservation table operable to store network resource reservation information between said terminal and a communication partner terminal; and
a configuration-change notifying unit operable to send a notice of a configuration change in the network and notice of the network resource reservation information to said management device,
wherein said management device comprises:
a packet receiving unit operable to receive a packet;
a packet sending unit operable to send a packet;
an information acquiring unit operable to acquire the MAC address information of the ports from said plural switching devices;
a configuration information generating unit operable to generate configuration information of the network;
a network resource management table operable to store network resource reservation information of the network; and
a network resource managing unit operable to manage a network resource of the network,
wherein when the link-state detecting unit detects a link-up, said terminal sends the notice of the configuration change of the network and the notice of the network resource reservation information stored in the network resource management table to said management device, and
wherein when said management device receives the notice from said terminal, the information acquiring unit acquires the MAC address information of the ports from said plural switching devices, the configuration information generating unit updates the network configuration information, based on the MAC address information acquired by the information acquiring unit, and the network resource managing unit generates reservation availability information indicating availability of a network resource reservation requested by said terminal, after examining the network resource reservation information received from said terminal, the network resource managing unit updates the network resource reservation information stored in the network resource management table, based on the reservation availability information, and the network resource managing unit sends notice of the reservation availability information to said terminal and a communication partner's terminal.

20. The communication system as defined in claim 19, wherein said configuration-change notifying unit sends the notice of the configuration change of the network and the notice of the network resource reservation information stored in the network resource management table in one or more link-change notifying packets.

21. The communication system as defined in claim 19, wherein said configuration-change notifying unit sends the notice of the configuration change of the network and the notice of the network resource reservation information stored in the network resource management table in one or more substitute packets other than link-change notifying packets.

22. The communication system as defined in claim 19, wherein said configuration-change notifying unit sends the notice of the configuration change of the network and the notice of the network resource reservation information stored in the network resource management table sent in the one or more substitute packets includes one of an ICMP message, information of services available at said terminal, information of a phone number of said terminal, and the network resource reservation information.

23. The communication system as defined in claim 19, wherein said configuration-change notifying unit sends the notice of the configuration change of the network and the notice of the network resource reservation information stored in the network resource management table by at least one of a multi-cast and a broadcast.

24. The communication system as defined in claim 19, wherein the information acquiring unit acquires the MAC address information using an SNMP.

25. The communication system as defined in claim 19, wherein the information acquiring unit acquires the MAC address information only from said plural switching devices that are in a path from said terminal that sent the notice to said management device.

26. The communication system as defined in claim 1, wherein said plural switching devices are base stations constituting a wireless LAN, and the link-state detecting unit is operable to detect a change of connection at one of the base stations as a link-up.

* * * * *